US011916428B2

(12) United States Patent
Peluso et al.

(10) Patent No.: US 11,916,428 B2
(45) Date of Patent: Feb. 27, 2024

(54) BATTERY VOLTAGE CONTROL AND REGULATION

(71) Applicant: Infineon Technologies Austria AG, Villach (AT)

(72) Inventors: Luca Peluso, Villach (AT); Matthias J. Kasper, Villach (AT)

(73) Assignee: Infineon Technologies Austria AG, Villach (AT)

( * ) Notice: Subject to any disclaimer, the term of this patent is extended or adjusted under 35 U.S.C. 154(b) by 11 days.

(21) Appl. No.: 17/549,021

(22) Filed: Dec. 13, 2021

(65) Prior Publication Data

US 2023/0187958 A1 Jun. 15, 2023

(51) Int. Cl.
*H02J 7/00* (2006.01)
*H02J 7/34* (2006.01)

(52) U.S. Cl.
CPC ...... *H02J 7/007182* (2020.01); *H02J 7/0013* (2013.01); *H02J 7/0047* (2013.01); *H02J 7/0063* (2013.01); *H02J 7/345* (2013.01)

(58) Field of Classification Search
CPC ...... H02J 7/0013; H02J 7/0047; H02J 7/0063; H02J 7/345
See application file for complete search history.

(56) References Cited

U.S. PATENT DOCUMENTS

| 6,140,799 A | 10/2000 | Thomasson |
| 2012/0313437 A1 | 12/2012 | Latham |
| 2021/0129700 A1* | 5/2021 | Song ....................... B60L 58/19 |

FOREIGN PATENT DOCUMENTS

| JP | 2013099002 A | * | 5/2013 | ............ B60L 3/0046 |
| JP | 2019161721 A | * | 9/2019 | |
| WO | WO-2012133706 A1 | * | 10/2012 | .......... H01M 10/441 |

OTHER PUBLICATIONS

Anzola Jon et al: "Review of Architectures Based on Partial Power Processing for DC-DC Applications", IEEE Access, IEEE, USA, vol. 8, Jun. 1, 2020 (Jun. 1, 2020), pp. 103405-103418, XP011792358.
Extended European Search Report, EP 22 21 3053, dated Mar. 28, 2023, pp. 1-13.
(Continued)

*Primary Examiner* — Metasebia T Retebo
*Assistant Examiner* — James G Yeaman
(74) *Attorney, Agent, or Firm* — Armis IP Law, LLC

(57) ABSTRACT

This disclosure includes novel ways of implementing a power supply that powers a load. A main battery source produces a main battery voltage; each of multiple auxiliary battery sources in a set produces a respective auxiliary battery voltage. A controller initially sets a battery supply voltage to the main battery voltage, the main battery voltage is supplied to a power converter. The controller then monitors a magnitude of the battery supply voltage and adjusts the battery supply voltage supplied to the power converter based on a comparison of the magnitude of the battery supply voltage with respect to a threshold level. The adjusted battery supply voltage is provided from a serial connection of the main battery source and a first auxiliary battery source in the set.

22 Claims, 15 Drawing Sheets

(56) References Cited

OTHER PUBLICATIONS

Iyer Vishnu Mahadeva et al: "A Partial Power Converter Interface for Battery Energy Storage Integration with a DC Microgrid", 2019 IEEE Energy Conversion Congress Andexposition (ECCE), IEEE, Sep. 29, 2019 (Sep. 29, 2019), pp. 5783-5790, XP033666387.

Munoz Rodrigo Venegas et al: "Evaluation of DC-DC buck-boost partial power converters for EV fast charging application", IECON 2021—47th Annual Conference of the IEEE Industrial Electronics Society, IEEE, Oct. 13, 2021 (Oct. 13, 2021), pp. 1-6, XP034014310.

Tsuruta Yukinori et al: "Development of SiC extremely high efficiency chopper for one battery HEECS", IECON 2016—42nd Annual Conference of the IEEE Industrial Electronics Society, IEEE, Oct. 23, 2016 (Oct. 23, 2016), pp. 2468-2473, XP033033272.

* cited by examiner

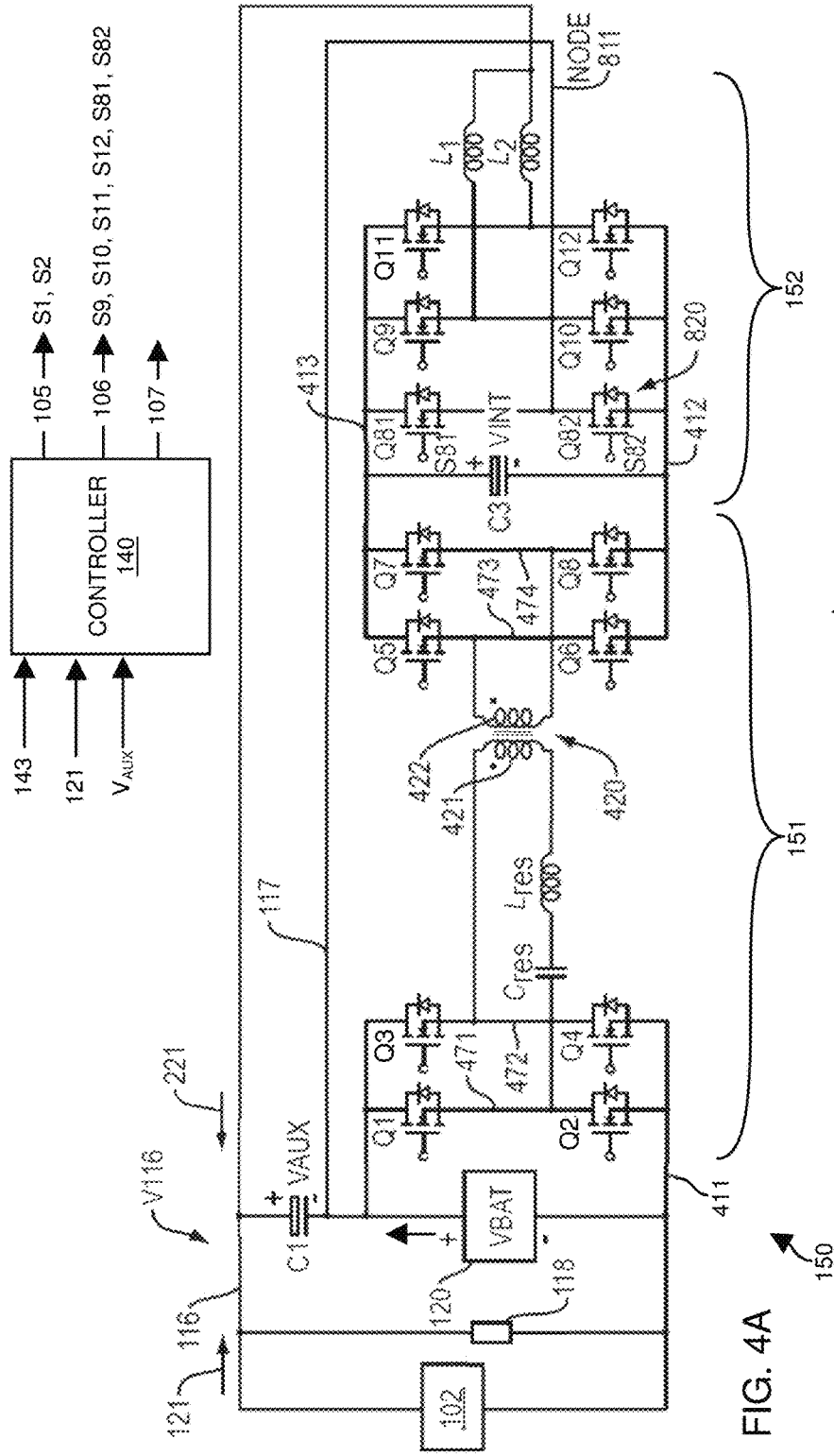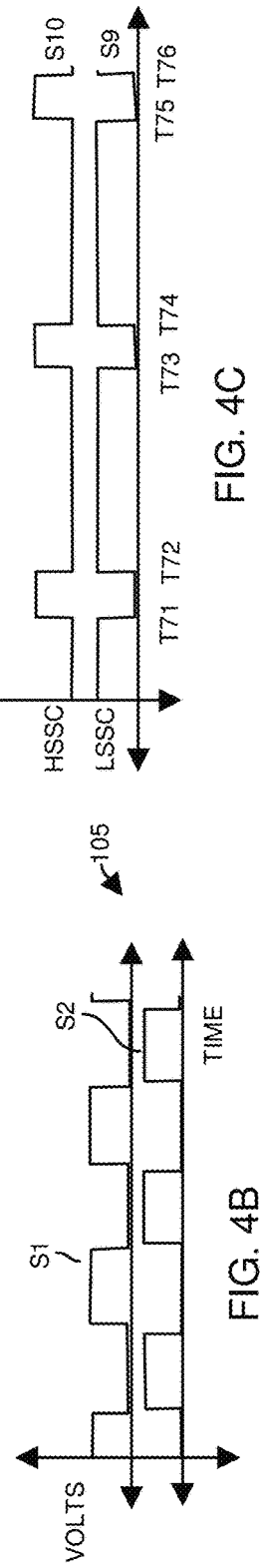
FIG. 4A
FIG. 4B
FIG. 4C

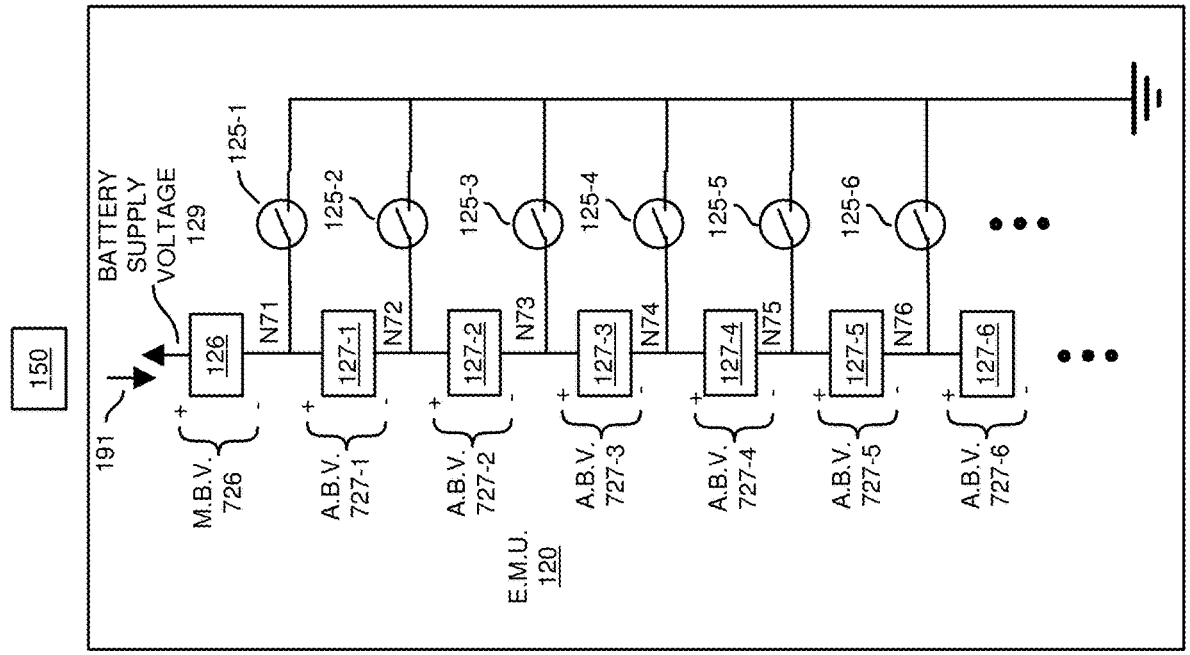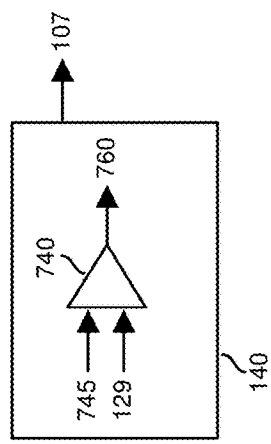
FIG. 7

BATTERY VOLTAGE CONTROL AND REGULATION

BACKGROUND

A conventional backup power system typically includes a battery to store energy to power a load during outages. For example, a load is typically powered via a main input voltage during normal operating conditions. When a power outage occurs, the main input voltage is no longer available. In such an instance, the backup power system supplies power the load via converting energy stored in the battery into a backup voltage supplied to the load.

Conventional power converter topologies include the well-known buck, boost, 4-switch buck-boost converters, etc. When implementing these topologies, the corresponding semiconductor devices must be rated according to the total output voltage (for boost converters) or total input voltage (for buck converters). This mandates employment of devices with a non-optimal FOM. Moreover, despite a narrow conversion range of voltage provided by a battery, and because of the high power consumption level of a load (3 kW in the considered case), the conventional converter experiences high currents impacting not only the efficiency of the power converter but also the cost and power density as both passive and active components need to be chosen according to such high currents.

BRIEF DESCRIPTION

Implementation of clean energy (or green technology) is very important to reduce our impact as humans on the environment. In general, clean energy includes any evolving methods and materials to reduce an overall toxicity on the environment from energy consumption.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, wireless base stations, etc. In certain instances, energy is stored in a respective one or more battery resource. Regardless of whether energy is received from green energy sources or non-green energy sources, it is desirable to make most efficient use of raw energy (such as storage and subsequent distribution) provided by such systems to reduce our impact on the environment. This disclosure contributes to reducing our carbon footprint and better use of energy via more efficient energy conversion.

An apparatus as discussed herein may include: a main battery source operative to produce a main battery voltage; a set of one or more auxiliary battery sources, each of which is operative to produce a respective auxiliary battery voltage; and a controller. The controller initially sets a battery supply voltage to the main battery voltage. The battery supply voltage is supplied to a power converter. The magnitude of the battery supply voltage decreases over time due to discharge of the main battery source. The controller monitors a magnitude of the battery supply voltage. Via at least one of the auxiliary battery sources in the set, the controller adjusts the battery supply voltage supplied to the power converter based on a comparison of the magnitude of the battery supply voltage with respect to a threshold level.

The adjusted battery supply voltage may be provided from a serial connection of the main battery source and a first auxiliary battery source in the set. The first auxiliary battery source may produce a first auxiliary voltage. The adjusted battery supply voltage may be a summation of the main battery voltage and a first auxiliary voltage.

The controller may control the adjusted battery supply voltage to be a first summation based on the monitored battery supply voltage. The first summation may be a sum of the main battery voltage and a first auxiliary battery voltage produced by a first auxiliary battery source in the set in response to detecting that the magnitude of the battery supply voltage is below the threshold level.

The controller may monitor the battery supply voltage equal to the first summation. In response to detecting that the battery supply voltage equal to the first summation falls below the threshold level, the controller may produce the adjusted battery supply voltage to be a second summation. The second summation may be a sum of the main battery voltage, the first auxiliary battery voltage, and a second auxiliary battery voltage provided by a second auxiliary battery source in the set.

The discharge of energy stored in the main battery source may cause the magnitude of the battery supply voltage to fall below the threshold level.

The main battery source and each of the auxiliary battery sources in the set may be connected in series with each other via connection nodes. The controller may produce the battery supply voltage from a voltage outputted from one of the connection nodes to maintain the magnitude of the battery supply voltage within a desired voltage range.

The controller may discontinue producing the battery supply voltage from the main battery source and the set of at least one auxiliary battery sources during a condition in which charge levels of the main battery source and the set of at least one auxiliary battery sources fall are determined or detected to be below a threshold value.

The main battery source may be hard-wired coupled in series with a first auxiliary battery source in the set via a first connection node; the first auxiliary battery source may be hard-wired coupled in series with a second auxiliary battery source in the set via a second connection node. The apparatus as further discussed herein may include first switch circuitry controlled by the controller and second switch circuitry controlled by the controller. The controller can be configured to: i) control the first switch circuitry to an ON state and the second switch circuitry to an OFF state to produce the supply voltage from a voltage at the first connection node during a first condition in which a magnitude of the main battery voltage is above the threshold level, and ii) control the second switch circuitry to an ON state and the first switch circuitry to an OFF state to produce the supply voltage from the second connection node during a second condition in which the magnitude of the main battery voltage is below the threshold level.

The power converter may be a bi-directional power source operative to charge the main battery source and the set of at least one auxiliary battery sources; each of the auxiliary battery sources in the set may be connected in series with each other; and the main battery source may be connected in series with the series connection of the auxiliary battery sources.

The apparatus as further discussed herein may include: a first switch coupled to a first node of the main battery source; a second switch coupled to a second node of the main battery source, the main battery voltage representing a voltage across the first node and the second node; auxiliary switches, each of which is coupled to a respective node connecting a corresponding pair of serially connected auxiliary battery sources in the set. The controller can be configured to control states of the first main switch, the second main switch, and the auxiliary switches to selectively control charging of the main battery source and the multiple auxiliary battery sources at different times.

Each of the multiple auxiliary battery sources in the set may include multiple batteries connected in parallel. The multiple auxiliary battery sources may be connected in series to produce a series stack of auxiliary battery sources electrically coupled to the main battery source. A magnitude of a number of the multiple batteries connected in parallel for a respective auxiliary battery source in the stack varying depending on a location of the respective auxiliary battery source in the serial stack. A first auxiliary battery source in the stack nearer the main battery source may be configured to include a greater number of batteries in parallel than a second auxiliary battery source in the stack disposed further away from the main battery source.

The controller may be configured to electrically couple a node of a respective auxiliary battery source in the set to a reference voltage to adjust the magnitude of the battery supply voltage.

This disclosure includes a system such as a power supply comprising: the apparatus as previously discussed and the power converter. The power converter may be a partial power converter operative to convert the battery supply voltage into an output voltage to power a load, the partial power converter may further generate the output voltage based a summation of the battery supply voltage and a supplemental voltage (auxiliary voltage) outputted from the partial power converter. The supplemental voltage may be derived from the supply voltage.

The partial power converter may be configured to regulate a magnitude of the output voltage with respect to a setpoint reference voltage. The supplemental voltage may be a differential voltage produced by the partial power converter, the differential voltage referenced with respect to the battery supply voltage to produce the output voltage.

The apparatus as may include a first circuit path connecting a capacitor, the main battery source, and one or more of the auxiliary battery sources in the set in series with each other via connection nodes. The power converter may produce an auxiliary voltage (a.k.a. supplemental voltage) from the battery supply voltage and storing the auxiliary voltage in the capacitor. The load may be disposed in parallel with the first circuit path.

This disclosure further includes a method comprising: initially setting a battery supply voltage to a main battery voltage produced by a main battery source, the battery supply voltage provided to a power converter; monitoring a magnitude of the battery supply voltage; comparing the magnitude of the battery supply voltage to a threshold level; and based on the comparison, adjusting the battery supply voltage supplied to the power converter via a set of one or more auxiliary battery sources, each of which is operative to produce a respective auxiliary battery voltage.

The method may further include: controlling the adjusted battery supply voltage to be a first summation, the first summation being a sum of the main battery voltage and a first auxiliary battery voltage produced by the first auxiliary battery source in response to detecting that the magnitude of the battery supply voltage falls below the threshold level.

The method may further include: in response to detecting that the battery supply voltage equal to the first summation falls below the threshold level, producing the adjusted battery supply voltage to be a second summation, the second summation being a sum of the main battery voltage, the first auxiliary battery voltage, and a second auxiliary battery voltage provided by a second auxiliary battery source in the set.

Note that although techniques as discussed herein may be applicable to power converters, the concepts disclosed herein may be advantageously applied to any other suitable topologies as well as general power supply control applications.

Note that any of the resources as discussed herein can include one or more computerized devices, controller, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different techniques as described herein.

Yet other implementations herein include software programs to perform the steps and operations summarized above and disclosed in detail below. One such implementation comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, one or more implementation herein are directed to methods, systems, computer program products, etc., that support operations as discussed herein.

One implementation herein includes a computer readable storage medium and/or system having instructions stored thereon. The instructions, when executed by computer processor hardware, cause the computer processor hardware (such as one or more co-located or disparately located processor devices) to: initially set a battery supply voltage to a main battery voltage produced by a main battery source, the battery supply voltage provided to a power converter; monitoring a magnitude of the battery supply voltage set to the main battery voltage; compare the magnitude of the battery supply voltage to a threshold level; and based on the comparison, adjust the battery supply voltage supplied to the power converter via a set of one or more auxiliary battery sources, each of which is operative to produce a respective auxiliary battery voltage.

The ordering of the steps above has been added for clarity sake. Note that any of the processing operations as discussed herein can be performed in any suitable order.

Other implementations of the present disclosure include software programs and/or respective hardware to perform any of the method steps and operations summarized above and disclosed in detail below.

It is to be understood that the system, method, apparatus, instructions on computer readable storage media, etc., as discussed herein also can be implemented strictly as a software program, firmware, as a hybrid of software, hardware and/or firmware, or as hardware alone such as within a processor (hardware or software), or within an operating system or a within a software application.

As discussed herein, techniques herein are well suited for use in the field of implementing one or more inductor components to deliver current to a load. However, it should be noted that implementations herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be implemented and viewed in many different ways.

Also, note that this preliminary discussion of implementations herein (BRIEF DESCRIPTION) purposefully does not specify every implementation and/or incrementally novel aspect of the present disclosure or claimed invention(s). Instead, this brief description only presents general implementations and corresponding points of novelty over conventional techniques. For additional details and/or possible perspectives (permutations) of the invention(s), the reader is directed to the Detailed Description section (which is a summary) and corresponding figures of the present disclosure as further discussed below.

BRIEF DESCRIPTION OF THE DRAWINGS

FIG. 4A is an example diagram illustrating a power supply circuit including details of a bidirectional power converter.

FIGS. 4B and 4C are example timing control diagrams associated with operation of the bidirectional power converter.

FIG. 7 is an example diagram illustrating generation of a battery supply voltage via a main battery source and one or more auxiliary battery sources.

Figure 1:
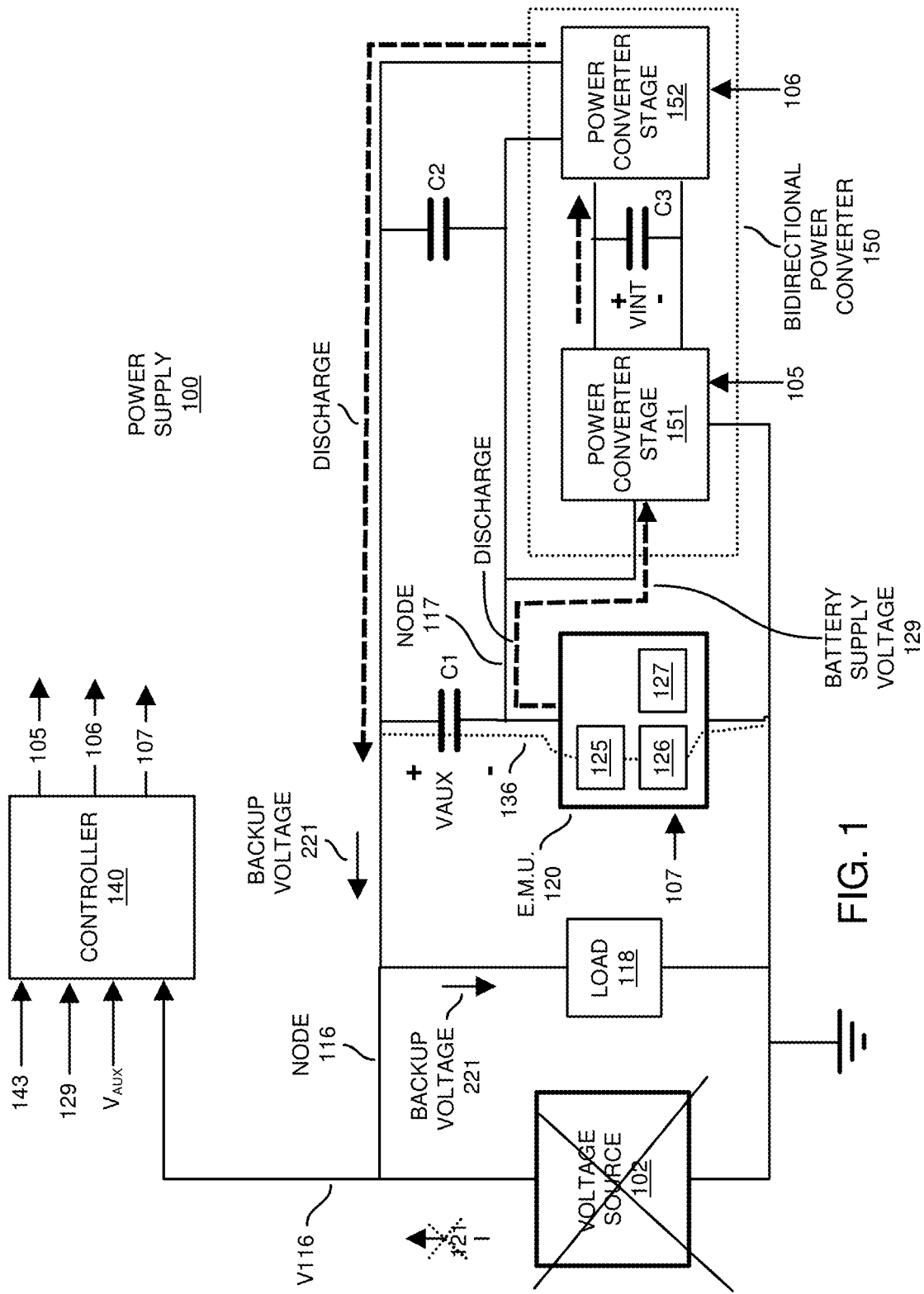
FIG. 1 is an example general diagram of a power supply including a power converter operating in a first mode (such as battery discharge mode).

The foregoing and other objects, features, and advantages of the invention will be apparent from the following more particular description of preferred implementations herein, as illustrated in the accompanying drawings in which like reference characters refer to the same parts throughout the different views. The drawings are not necessarily to scale, with emphasis instead being placed upon illustrating the implementations, principles, concepts, etc.

DETAILED DESCRIPTION

Now, more specifically, FIG. 1 is an example general diagram of a power supply including a power converter operating in a first mode (battery discharge mode).

The power supply 100 includes controller 140, voltage source 102, energy management unit 120 (such as including switches 125, main battery source 126, auxiliary battery sources 127 or other suitable energy storage entities), and bidirectional power converter 150.

As shown, the bidirectional power converter 150 includes multiple power converter stages such as power converter stage 151 and power converter stage 152. The multiple capacitors such as capacitor C1, capacitor C2, capacitor C3, etc., to store voltage/charge.

In one implementation, a first circuit path connects the capacitor C1, the main battery source 125, and one or more of the auxiliary battery sources 126 in series with each other via connection nodes as further discussed herein. The power converter 150 produces an auxiliary voltage VAUX (a.k.a., supplemental voltage) from the battery supply voltage 129 and stores (applies or outputs) the auxiliary voltage in the capacitor; the load 118 is disposed in parallel with the first circuit path 136.

In this example, the voltage source 102 experiences a condition in which the magnitude of the input voltage 121 (and corresponding input current) drops below a respective threshold value. The controller 140 monitors a magnitude of the voltage 121 (V116) at node 116. In response to detecting that the magnitude of the voltage 121 is below a respective threshold value, the controller 140 produces the control signals 105 and 106 to operate the bidirectional power converter 150 in a first mode (discharge mode) of producing backup voltage 221 from the energy management unit 120 to power the load 118 because voltage 121 is not present.

The controller 140 generates control signals 107 to control operation of the energy management unit 120.

During the power outage associated with the voltage source 102, the battery supply voltage 129 is a substitute source used by the bidirectional power converter 150 to power the load 118 such as when the voltage 121 from voltage source 102 is below a threshold value. Switchover of the bidirectional power converter 150 to the first mode (discharge mode) in FIG. 1 ensures that the load 118 is continuously or near continuously powered with a respective voltage without interruption or with a short interruption when the voltage source 102 fails to produce the input voltage above a threshold value.

The bidirectional power converter 150, while in mode #1, produces the backup voltage 221 as a combination (such as summation) of the battery supply voltage 129 (first voltage) supplied by the energy management unit 120 and a ground-isolated auxiliary voltage VAUX derived from the battery supply voltage 129 via operation of the bidirectional power converter 150.

More specifically, in furtherance of producing the backup voltage 221 to power the load 118 when the input voltage from voltage source 102 is not present or is below a threshold value, the controller 140 controls operation of the bidirectional power converter 150 to produce an auxiliary voltage VAUX from the battery supply voltage 129 (VBAT) outputted from the energy management unit 120.

As depicted in FIG. 1, during the first mode, the bidirectional power converter 150 offsets the auxiliary voltage VAUX by the battery supply voltage 129 to produce the backup voltage 221.

As previously discussed, the bidirectional power converter 150 can be configured to include any number of power stages and/or power converters. For example, the bidirectional power converter 150 includes power converter stage 151 such as an unregulated power converter stage and power converter stage 152 such as a regulated power converter stage.

Via the first power converter stage 151, the bidirectional power converter 150 produces an intermediate unregulated voltage VINT (such as a DC voltage) from a battery supply voltage 129 outputted from the energy management unit 120 (such as a battery or other suitable resource). The power converter stage 151 outputs the intermediate voltage VINT to the capacitor C3.

The power converter stage 152 receives the intermediate voltage VINT stored in the capacitor C3. Via the power converter stage 152 (such as regulated power converter stage), the bidirectional power converter 150 converts the intermediate voltage VINT into a ground-isolated auxiliary voltage VAUX.

As previously discussed, the isolated auxiliary voltage VAUX is offset or referenced with respect to the battery supply voltage 129 associated with the energy management unit 120 to produce the backup voltage 221. In such an instance, the backup voltage 221 is a summation of a magnitude of the battery supply voltage 129 supplied by the energy storage resource 120 and a magnitude of the auxiliary voltage VAUX.

In the discharge mode, the controller 140 monitors a magnitude of the voltage V116 at node 116. When the voltage from the voltage source 102 falls below a threshold value such as 48 VDC or other suitable threshold value, the controller 140 controls a magnitude of the auxiliary voltage VAUX produced by the power converter stage 152 such that the magnitude of the backup voltage 221 is equal to a target backup voltage value such as 48 VDC (or other suitable value) to power the load 118.

As further discussed herein, note that the battery supply voltage 129 supplied by the energy management unit 120 is susceptible to varying over time during the first operational mode. Via operation of the power converter stage 152 and generation of corresponding control signals 106 to drive the power converter stage 152, the controller 140 varies a magnitude of the auxiliary voltage VAUX such that the sum of the battery supply voltage 129 and the auxiliary voltage VAUX is equal to a desired setpoint reference voltage 143 such as 48 VDC.

Figure 2:
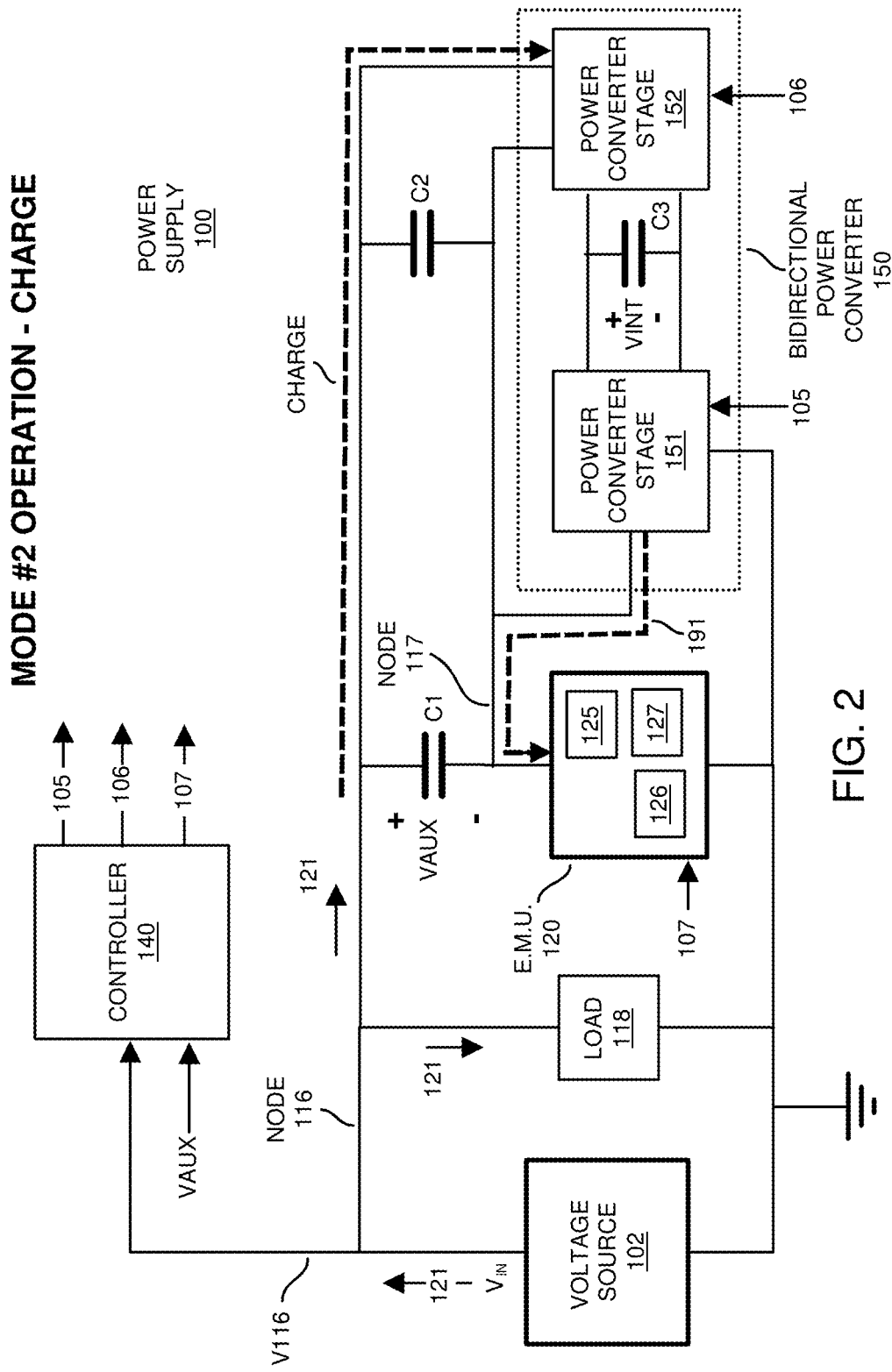
FIG. 2 is an example general diagram of a power supply including a power converter operating in a second mode (such as battery charge mode).

FIG. 2 is an example general diagram of a power system (power supply) including multiple power converters operating in a second mode.

In this example, in a similar manner as previously discussed, the power supply 100 includes controller 140, voltage source 102, energy storage resource 120 (such as battery assembly, battery backup system, or other suitable entity), and bidirectional power converter 150. The bidirectional power converter 150 includes multiple power converter stages such as power converter stage 151 and power converter stage 152.

Note that the bidirectional power converter 150 and corresponding power converter stage 151, capacitor C3, and power converter stage 152 is considered to be a single power converter stage providing one or more functions such as voltage regulation, ground isolation capabilities (e.g. LLC), etc., as described herein.

As further shown, the power supply 100 includes multiple capacitors such as capacitor C1, capacitor C2, capacitor C3, etc., to store voltage/charge.

The controller 140 operates the bidirectional power converter 150 in multiple different modes depending upon a status of the voltage source 102.

For example, the controller 140 monitors a magnitude of the voltage V116 at node 116 supplied from the input voltage source 102 to the load 118. Based on a magnitude of the input voltage 121 (voltage V116 at node 116) supplied to node 116, the controller 121 switches between: i) a second mode of operating the bidirectional power converter 150 to charge the energy storage resource 120 using (a portion of power provided by) the input voltage 121, and ii) a first mode of producing a backup voltage 221 (see FIG. 2) from the energy storage resource 120 to power the load 118 as a substitute to the input voltage 121 such as when the input voltage 121 is below a threshold value.

Assume in this example implementation of FIG. 1 that the magnitude of the input voltage 121 supplied by the voltage source 102 is above a threshold value and that the controller detects that the energy storage resource 120 needs to be charged. The controller monitors a status of the battery voltage or other suitable parameter to determine a state of charge associated with the energy storage resource 120 and whether the energy storage resource 120 needs to be charged or not using power from the input voltage 121.

During conditions in which the one or more battery source in the energy storage resource 120 needs to be charged, the controller 140 produces the respective control signals 105 and 106 to operate the bidirectional power converter 150 in a charge mode in which the input voltage 121 is conveyed to the power converter stage 152. Based on the input voltage 121, via controller 140, the power converter stage 152 produces intermediate voltage VINT stored on capacitor C3. Power converter stage 151 receives the intermediate voltage VINT and converts the intermediate voltage VINT into charge voltage 191 applied to the energy management unit 120 to charge respective main battery source 125 and the auxiliary battery sources 127.

Thus, the bidirectional power converter 150 controls a flow of power (energy) between the input voltage source 102 and the energy management unit 120.

In one implementation, such as previously discussed with respect to FIG. 2, the voltage source 102 powers the load 118 when the input voltage 121 is around 50 VDC. When the input voltage 121 falls below a threshold value such as 48 VDC as shown in FIG. 1, the controller 140 controls operation of the bidirectional power converter 150 in a manner as previously discussed to produce the backup voltage 221 to be around a target value of 48 VDC. Powering the load 118 with the backup voltage 221 as a backup to the input voltage 121 ensures that the load 118 is powered when voltage source 102 is unable to power the load 118 via the input voltage 121.

As further discussed herein, note that the controller 140 can be configured to controllably switch a polarity of the isolated auxiliary voltage VAUX to generate the backup voltage. For example, the magnitude of the battery supply voltage 129 may be greater than or less than a magnitude of the target backup voltage of 48 VDC. As further discussed herein, if the battery supply voltage 129 is less than backup target voltage 48 VDC, the controller 140 produces the regulated auxiliary voltage VAUX to be a positive value; if the battery supply voltage 129 is greater than target backup 48 VDC, the controller 140 produces the regulated auxiliary voltage VAUX to be a negative value.

The magnitude of the battery supply voltage 129 can be greater than or less than the target voltage such as 48 VDC. A magnitude of the battery supply voltage 129 varies in a voltage range such as between 46 and 50 VDC. As further discussed herein, the controller produces the control signals 107 to regulate a respective magnitude of the battery supply voltage 129 outputted from the energy management unit 120.

Figure 3:
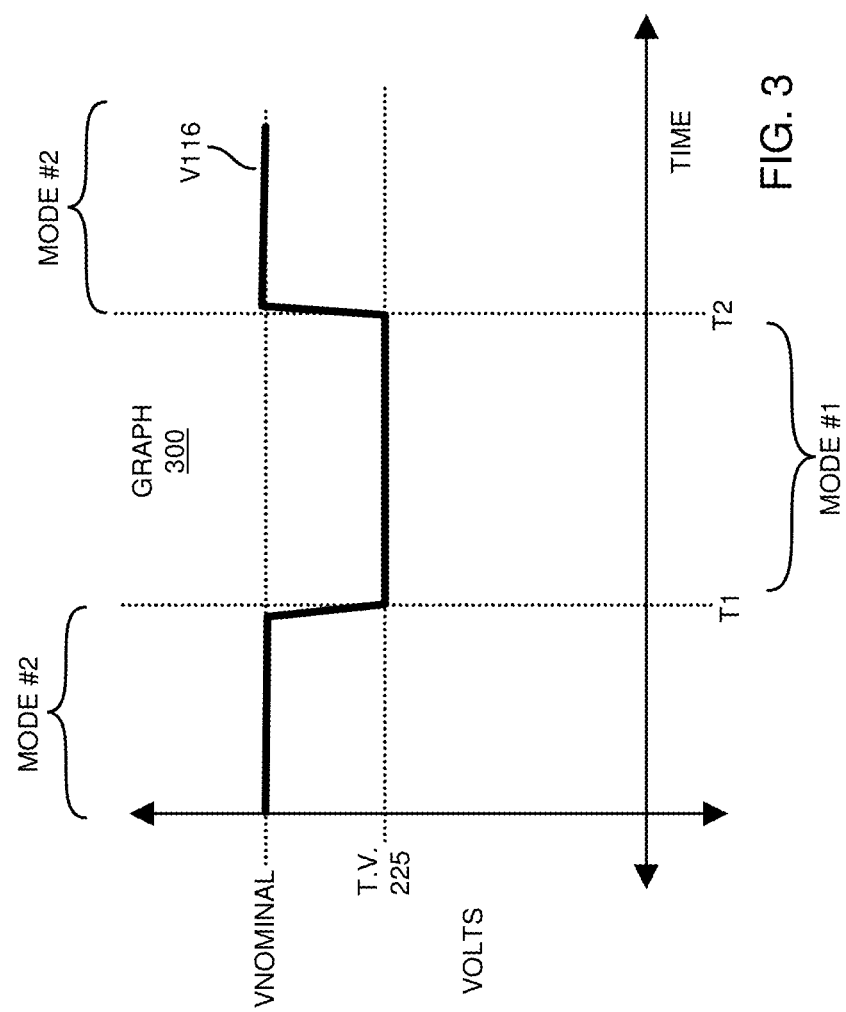
FIG. 3 is an example graph illustrating operation of a power converter in different modes depending on a magnitude of an input voltage.

FIG. 3 is an example graph illustrating operation of a power converter in different modes depending on a magnitude of an input voltage.

As previously discussed, power supply 100 supplies an input voltage 121 (such as around 50 VDC) during normal operating conditions when the voltage source 102 is healthy. Assume that the input voltage 121 is equal to VNOMINAL=50 VDC. The power supply 100 supports lower conversion and distribution losses, keeping a safe voltage for human contact during maintenance and reducing the possibility of employing back up batteries during power outages. The proposed power supply 100 aims specifically to this last point.

For example, as depicted in FIG. 1, the energy management unit 120 (such as back-up battery system of one or more batteries) is used to produce the backup voltage 221 supplied to the load 118 when the input voltage 121 falls below a threshold value 225 such as around 48 VDC (or other suitable value).

Referring again to FIG. 3, before time T1, graph 300 illustrates operation of the bidirectional power converter 150 in the second operational mode (mode #2) of charging, if needed, the energy storage resource 120 based on the input voltage 121 supplied by the voltage source 102. Between time T1 and time T2, the controller 140 detects that the magnitude of the input voltage 121 from voltage source 102 falls below the threshold value 225. To provide backup power, the controller 140 operates the bidirectional power converter 150 to produce the backup voltage 221 between time T1 and T2.

Note again that the power converter stage 151 (such as a one or more DC/DC power converter stages) provides bidirectionality, since in addition to supplying power to produce the backup voltage 221 (such as regulated voltage VAUX plus VBAT) when the voltage source 102 (such as a main AC/DC converter) fails, the bidirectional power converter 150 also has to charge the energy storage resource 120 during normal operational mode when the voltage source 102 supplies a proper magnitude of voltage (via input voltage 121) to the load 118.

Note further that the implementation of the bidirectional power converter 150 (such as including a back-up battery DC/DC stage) depends on the input voltage 121, which corresponds to the battery voltage range (associated with battery supply voltage 129 or, a.k.a., VBAT) that is defined by the maximum and minimum battery voltages during the charging phase (mode #2) and discharging phase (mode #1). Such voltage range depends on the specific configuration of the energy storage resource 120 (such as battery pack or other suitable entity). There are several energy storage resource configurations, but in general they can be classified in 3 different sets according to their voltage ranges in relation to the target bus voltage (i.e., 48 VDC).

Based on the concept of "Partial-Power-Conversion" as described herein, the bidirectional power converter 150 introduces novel power converter topology implementations for each of multiple different battery pack configurations. The bidirectional power converter 150 as described herein provides: i) outstanding efficiency, ii) enables use of semiconductor devices with a better FOM, iii) offers a fast load response due to the buck-like dynamic operation in all load cases, etc.

In this class of partial power converters, the required output voltage V_load (backup voltage 221) is given by the summation of the battery voltage V_batt (battery supply voltage 129), which therefore directly contributes to build the backup voltage 221, and of a regulated auxiliary voltage V_aux outputted by the converter 150 such that backup voltage 221=V_load=V_batt+V_aux, where Voltage_batt=battery supply voltage 129.

The total efficiency of the system η_tot is given by the following formula:

$$\eta\_tot = 1 - P\_conv/P\_load(1-\eta\_conv)$$

Where P_load is the total power demanded by the load 118, η_conv is the efficiency of the converter and P_conv is the processed power, which is only a portion of the total power P_load.

This formula shows that the lower the processed power P_conv, the higher the efficiency of the system.

The processed power is given by the following formula:

$$P\_conv = P\_load \, |1 - V\_batt/V\_load|$$

It is clear that to minimize the power processed by the bidirectional power converter 150 (and therefore to maximize the efficiency), the ratio of V_batt/V_load needs to be as close as possible to 1. This requires generation of a battery supply voltage 129 as close as possible to the target load voltage of 48 VDC.

However, the battery supply voltage 129 is not a fixed value, but it varies within a given range and depending on the charge level of the main battery source 126 and one or more auxiliary battery sources 127 connected in series. Thus, a high efficiently setpoint for operating the power supply 100 is to select a main battery source 126 with a voltage range as narrow as possible and centered around the desired target output voltage (such as V_load around 48 VDC).

FIG. 4A is an example diagram illustrating a power supply circuit including a bidirectional power converter.

As shown, the power converter stage 151 of the bidirectional power converter 150 includes switches Q1, Q2, Q3, Q4, Q5, Q6, Q7, and Q8. Additionally, the power converter stage 151 includes capacitor Cres, inductor Lres, and transformer 420. Transformer 420 includes primary winding 421 magnetically coupled to secondary winding 422.

Note that the power converter stages 151 and 152 can be replaced with any suitable one or more suitable power converters.

As further shown, switch Q1 and switch Q2 are connected in series between the node 117 and node 411. More specifically, the drain node of switch Q1 is connected to the node 117; the source node of switch Q1 is connected to the drain node of switch Q2 at node 471; the source node of switch Q2 is connected to the ground reference node 411.

Switch Q3 and switch Q4 are connected in series between the node 117 and node 411. More specifically, the drain node of switch Q3 is connected to the node 117; the source node of switch Q3 is connected to the drain node of switch Q4 at node 472; the source node of switch Q4 is connected to the ground reference node 411.

The combination of capacitor Cres, inductor Lres, and the primary winding 421 are connected in series between node 471 and node 472.

As further shown, switch Q5 and switch Q6 are connected in series between the node 413 and node 412. More specifically, the drain node of switch Q5 is connected to the node 413; the source node of switch Q5 is connected to the drain node of switch Q6 at node 473; the source node of switch Q6 is connected to the isolated ground reference node 412.

The secondary winding 422 is connected between node 473 and node 474.

Capacitor C3 (storing intermediate voltage VINT) is connected between node 413 and node 412.

As previously discussed, the controller 140 produces signals S1 and S2. Control signal S1 is inputted to the gates of switches Q1, Q4, Q5, and Q8. Control signal S2 is inputted to the gates of switches Q2, Q3, Q6, and Q7.

Switching operation of the power converter stage 151 and conversion of the battery supply voltage 129 into the intermediate voltage VINT during generation of the backup voltage 221 is further shown in FIG. 4B. Switching operation of the power converter stage 152 and conversion of the intermediate voltage VINT into the auxiliary voltage VAUX during generation of the backup voltage 221 is further shown in FIG. 4C.

Referring again to FIG. 4A, as further shown, the power converter stage 152 of the bidirectional power converter 150 includes switches Q9, Q10, Q11, and Q12. Additionally, the power converter stage 152 includes inductor L1 and inductor L2.

As further shown, switch Q9 and switch Q10 are connected in series between the node 413 and node 412. More specifically, the drain node of switch Q9 is connected to the node 413; the source node of switch Q9 is connected to the drain node of switch Q10 at node 481; the source node of switch Q10 is connected to the node 412.

Switch Q11 and switch Q12 are connected in series between the node 413 and node 412. More specifically, the drain node of switch Q11 is connected to the node 413; the source node of switch Q11 is connected to the drain node of switch Q12 at node 482; the source node of switch Q12 is connected to the node 412.

As previously discussed, the controller 140 produces signals 106 such as signals S9, S10, S11, and S12. Control signal S9 is inputted to the gate of switch Q9 (such as high side switch circuitry); control signal S10 is inputted to the gate of switch Q10 (such as low side switch circuitry); control signal S11 is inputted to the gate of switch Q11 (such as high side switch circuitry); control signal S12 is inputted to the gate of switch Q12 (such as low side switch circuitry).

Inductor L1 is connected between node 481 and node 116; inductor L2 is connected between node 482 and node 116. Thus, power converter stage 152 includes multiple buck converters in parallel. The power converter stage 152 can include any number of buck converter phases to convert the voltage VINT into the aux voltage AUX.

Switching operation of the power converter stage 152 and conversion of the intermediate voltage VINT into the auxiliary voltage VAUX during generation of the backup voltage 221 is further shown in FIG. 4C.

Referring again to FIG. 4A, among the various battery packs available on the market, the 14S5P represents the sweet-spot for this class of converters. The reason lies in the fact that its voltage range is 58.8V to 35V which is nicely fulfilling to the need of having an input battery voltage range centered around the required output voltage V_load of 48V that is needed to minimize the processed power and therefore to increase the overall system efficiency. According to the previously shown formula the maximum processed power (occurring when the battery voltage is 35V) is 813 W, hence, due to the partial power conversion, only an 813 Watt rated converter is needed to regulate 3 kW output power In one implementation, the magnitude of the battery supply voltage 129 from the energy storage resource 120 varies between 50 and 46 VDC, depending on a state of charge and series selection of main battery source 126 and auxiliary battery sources 127. While in mode #1, the controller 140 controls a state of the switches Q1-Q12 in the bidirectional power converter 150 such that the magnitude of the backup voltage 221 is equal to the target backup voltage 48 VDC. In such an instance, the bidirectional power converter 150 produces the auxiliary voltage VAUX such that the backup voltage 221 is equal to the target voltage value 48 VDC.

As previously discussed, the bidirectional power converter 150 is constituted by two cascaded stages power converter stage 151 and power converter stage 152. The power converter stage 151 includes a x:y unregulated DCX stage (where x and y are any suitable turn values associated with respective windings of the transformer 420, x being the number of turns associated with winding 421, y being the number of turns associated with the winding 422) operated under resonance condition and soft-switching. The power converter stage 151 provides the required isolation and, since the transformer 421 turn ratio is equal to x:y, the secondary winding 422 supplies the second power converter stage 152 with a voltage equal to the battery supply voltage 129 stored as intermediate voltage VINT in capacitor C3. Via the transformer 420 and corresponding isolation, the intermediate voltage VINT is not referenced to the same ground reference at node 411. In other words, intermediate voltage VINT has its own isolated ground reference at node 412.

The resonant inductor Lres of the power converter stage 151 is assumed to be the leakage inductance of transformer 420. The controller 140 controls the switching frequency of the power converter stage 151 and corresponding switches to be near or the same as the resonant switching frequency associated with the series resonant circuit including capacitor Cres, inductor Lres, and primary winding 421.

The power converter stage 152 receiving the generated intermediate voltage VINT is a two phase interleaved regulated buck converter which outputs the auxiliary voltage VAUX. The buck converters in the power converter stage 152 can be operated in any suitable mode such as CCM (Continuous Conduction Mode), DCM (Discontinuous Conduction Mode) or BCM/TCM (Boundary/Triangular Current Mode) for soft-switching capabilities. As previously discussed, the load voltage is given by the summation Vbat+Vaux, where Vaux is the auxiliary supplemental voltage outputted by the converter and Vbat is the battery voltage which can be either given only by the main battery or by the summation of the main battery voltage and the auxiliary battery/ies voltage:

$$V\_load = BAT + VAUX$$

Thus in one implementation, the power supply 100 includes power converter 150, which is a so-called partial power converter operative to convert the battery supply voltage 129 into an aux voltage VAUX and output voltage 221 (backup voltage) to power a load 118. The partial power converter 150 generates the output voltage (backup voltage 221) based a summation of the battery supply voltage produced by the main battery source 125 and a supplemental voltage Vaux outputted from the partial power converter. As discussed herein, the supplemental voltage Vaux is derived from the battery supply voltage 129. The power converter 150 regulates a magnitude of the output voltage 221 with respect to a setpoint reference voltage 143. The supplemental voltage (VAUX) is a differential voltage produced by the partial power converter; the differential voltage is referenced with respect to the battery supply voltage 129 to produce the backup voltage 221 (a.k.a., output voltage) powering the load 118.

Figure 5:
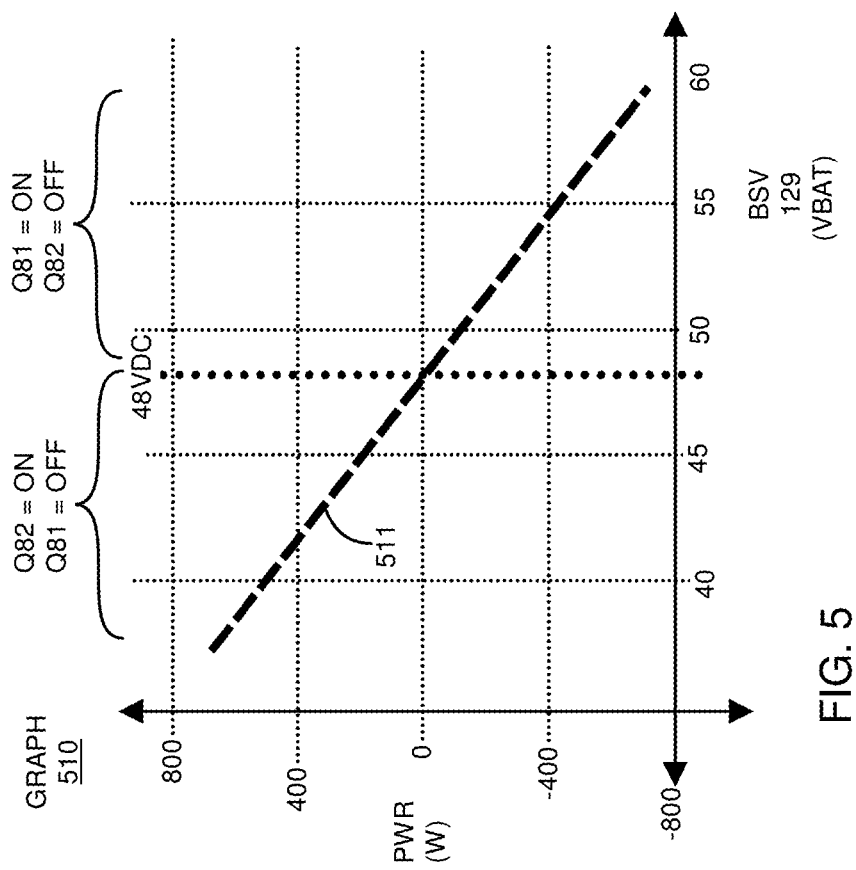
FIG. 5 is an example diagram illustrating the power processed by the partial power converter versus the battery voltage for a respective load.

FIG. 5 is an example diagram the power processed by the partial power converter versus the battery voltage for a respective load.

Via function 511, graph 510 illustrates that the polarity of the auxiliary voltage of capacitor C1 must be switched depending on a magnitude of the battery supply voltage 129. For example, during operation in discharge mode #1 of generating the backup voltage 221, as previously discussed, the controller activates switch Q81 (FIG. 5) to an ON state and deactivates switch Q82 (FIG. 4) to an OFF state when the magnitude of the battery supply voltage 129 is greater than the target voltage (setpoint reference voltage 143) of 48 VDC; the controller 140 deactivates switch Q81 to an OFF state and activates switch Q82 to an ON state when the magnitude of the battery supply voltage 129 is less than the target voltage of 48 VDC. This ensures that the polarity of the auxiliary voltage VAUX is correct when generating the backup voltage 221 to be 48 VDC across the range of magnitudes between 46 and 50 VDC.

Figure 6:
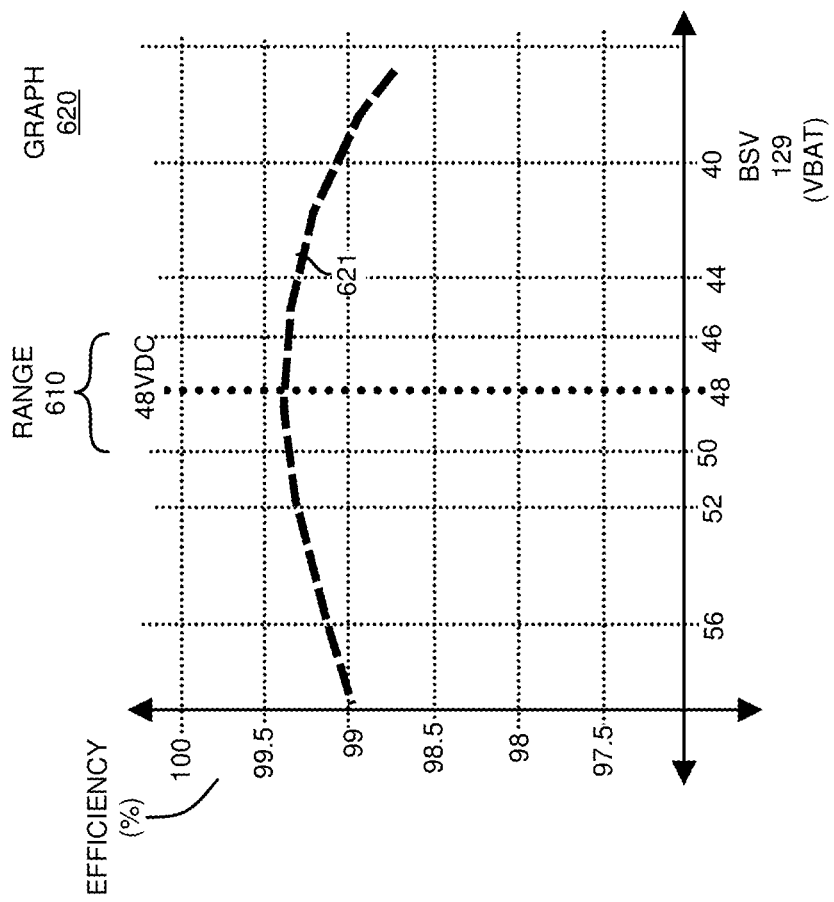
FIG. 6 is an example diagram illustrating conversion efficiency versus battery supply voltage in a partial power converter.

FIG. 6 is an example diagram illustrating conversion efficiency versus battery voltage.

The function 621 in graph 620 is a plot of efficiency associated with the bidirectional power converter 150 converting the battery supply voltage 129 into the backup voltage 221. When the battery supply voltage is between 46 VDC and 50 VDC, the efficiency is very high because most power is supplied by the energy management unit 120 without being converted via the bidirectional power converter 150. In other words, as previously discussed, the backup voltage 221 is primarily produced from the supply voltage 129.

The rising and then falling trend of the efficiency as indicated by function 621 arises from the fact that a battery voltage approaching the required output voltage (48V) leads to less processed power (by the bidirectional power converter 150) and therefore to an increased efficiency. On the other hand, when a magnitude of the battery supply voltage 129 moves further away from the target output voltage 48 VDC, the power processed by the bidirectional power converter 150 increases again and therefore the efficiency decreases.

Thus, the narrower the input battery voltage range with respect to the setpoint reference voltage 143 of 48 VDC (range being maximum and minimum battery voltages closer to setpoint reference voltage of 48 VDC), the less the power is processed by the bidirectional power converter 150, resulting in higher the efficiency and the lower the power rating of the converter. Thus, regulation of the battery supply voltage 129 as discussed herein substantially reduces a respective size of the components in the bidirectional power converter 150 because the converter process substantially less power than conventional techniques.

Let's consider the main battery source 126 implements as a 12S6P (12 individual battery units, each having 6 batteries in parallel): its voltage range is from 50.4 VDC to 30 VDC, the maximum battery voltage is closer to 48V than the 14S5P pack which is good and only 150 W out of 3 kW are processed when V_batt=50.4V. However, the minimum voltage (30V) is further away from 48 VDC with respect to the one of the 14S5P pack which leads to a processed power of 1125 W and thus requiring a converter rated at such power.

One implementation as described herein includes building a main battery source 126 with the same elementary cell, total energy (Wh) not lower than 14S5P back and with a voltage range centered at 48 VDC, but greatly narrowed down enabling the converter 150 to operate at even higher efficiencies and to be rated at an extremely low power level therefore pushing further the power density and/or reducing the cost As discussed below, the system as discussed herein enables a battery voltage range of 50.4V to 46.2V while using the same elementary cells shown before and without decreasing the overall available battery pack energy. Of course, the concept introduced here can be applied to build and necessary voltage range.

Implementation of the power supply 100 as described herein and regulating a magnitude of the battery supply voltage 129 provides the benefit of the battery supply voltage 129 being much closer to the required 48 VDC output voltage. As previously discussed, this means that the maximum processed power is much lower with respect to wider voltage ranges such that power loss occurs when the battery voltage is 50.4V and it amounts at 150 W, which means that only a 150 W converter is needed to provide 3 kW output power enabling therefore an increase in power density and less costs.

As shown in FIG. 6, when controlling the magnitude of the input voltage to be within a tight range 610 (such as between approximately 46 volts DC and 50 volts DC), the power converter 150 processes very low power to produce the auxiliary voltage Vaux and maintain the respective magnitude of the backup voltage 221 at the desired setpoint of 48 volt DC. This results in a very high power conversion efficiency.

As a range of the battery supply voltage 129 is regulated to be smaller and smaller with respect to a desired setpoint reference voltage, the magnitude of the auxiliary voltage decreases and the amount of power processed by the power converter 150 to produce the auxiliary voltage decreases, resulting in a more efficient power supply 100.

Additional details of controlling the magnitude of the battery supply voltage 129 during a power outage are further presented below.

FIG. 7 is an example diagram illustrating generation of a battery supply voltage via a main battery source and one or more auxiliary battery sources.

In this example implementation, the energy management unit 120 includes the battery source 126 that produces respective main battery voltage 726.

The energy management unit 124 further includes one or more auxiliary battery sources such as auxiliary battery source 127-1 that produces auxiliary battery voltage 727-1.

The main battery source 126 and each of the auxiliary battery sources 127 are disposed in series via connection nodes. For example, the connection node N71 (such as a first hard-wired connection node) provides connectivity between the combination of main battery source 126, auxiliary battery source 127-1 and the switch 125-1; the connection node N72 (such as a second hard-wired connection node) provides connectivity between the combination of auxiliary battery source 127-1, auxiliary battery source 127-2 and the switch 125-2; the connection node N73 (such as a third hard-wired connection node) provides connectivity between the combination of auxiliary battery source 127-2, auxiliary battery source 127-3 and the switch 125-3; the connection node N74 (such as a fourth hard-wired connection node) provides connectivity between the combination of auxiliary battery source 127-3, auxiliary battery source 127-4 and the switch 125-4; the connection node N75 (such as a fifth hard-wired connection node) provides connectivity between the combination of auxiliary battery source 127-4, auxiliary battery source 127-5 and the switch 125-5; the connection node N76 (such as a sixth hard-wired connection node) provides connectivity between the combination of auxiliary battery source 127-5, auxiliary battery source 127-6 and the switch 125-6; and so on.

Each of the switches 125 of the energy management unit 120 may be configured to block/convey voltages/currents in both directions. Thus, the switches 125 enable charging and discharging of energy from the respective battery sources.

Activation of a respective one of the multiple switches 125 controls which of the series connected battery sources are going to be charged or discharged. For example, when switch 125-1 is activated (to a shorted state) and all other switches (125-2, 125-3, 125-4, etc.) are deactivated (to an open state) at time T81 (see FIG. 8 as well), the negative terminal of the main battery source 126 is connected to the ground reference. In such an instance, the battery supply voltage 129 is equal to the main battery voltage 726 outputted from the main battery source 126. Discharge of energy stored in the main battery source 126 causes the magnitude of the main battery voltage 726 to decrease over time and eventually fall below the threshold level 745 at time T82 (see FIG. 8 as well). Between time T81 and T82 (see FIG. 8 as well), the auxiliary voltage Vaux starts out negative and ramps to a positive value is operative to maintain a respective magnitude of the backup voltage to 221 have a substantially constant value.

The controller 140 monitors a magnitude of the battery supply voltage 129. For example, via comparator 740, the controller 140 compares a magnitude of the battery supply voltage 129 to a respective minimum threshold value 745 (such as 46 volts DC). In response to detecting that the magnitude of the battery supply voltage 129 crosses (such as drops below) the threshold value 745 at time T82, the controller 140 produces the control signals 107 to activate a different switch of the multiple switches 125, resulting in an additional auxiliary battery source being connected in series with the main battery supply 126 in a manner as further discussed below.

In other words, to increase the magnitude of the battery supply voltage 129, the controller 140 activates a different switch of the multiple switches 125.

More specifically, when the main battery voltage 726 falls below the threshold level 745 at time T81 (see FIG. 8 as well), the controller 140 activates switch 125-2 and deactivates switch 125-1. When switch 125-2 is activated (to a shorted state) and the other switches (125-1, 125-3, 125-4, etc.) are deactivated (to an open state), the negative terminal of the auxiliary battery source 127-1 (node N72) is connected to the ground reference. In such an instance, the main battery source 126 and the auxiliary battery source 127-1 are connected in series to the ground reference voltage through switch 125-2 such that the battery supply voltage 129 is equal to the main battery voltage 726 outputted from the main battery source 126 plus the auxiliary battery voltage 727-1 outputted from the auxiliary battery source 127-1.

When the battery supply voltage 129 such as a summation of the main battery voltage 726 and the auxiliary battery voltage 727-1 falls below the threshold level 745 at time T83 (see FIG. 8 as well), the controller 140 activates switch 125-3 and deactivates switch 125-2. When switch 125-3 is activated (to a shorted state) and the other switches (125-1, 125-2, 125-4, etc.) are deactivated (to an open state), the negative terminal of the auxiliary battery source 127-2 (node N73) is connected to the ground reference. In such an instance, the main battery source 126, the auxiliary battery source 127-1, and the auxiliary battery source 127-2 are connected in series to the ground reference voltage through switch 125-3 such that the battery supply voltage 129 is equal to the main battery voltage 726 outputted from the main battery source 126 plus the auxiliary battery voltage 727-1 outputted from the auxiliary battery source 127-1 plus the auxiliary battery voltage 727-2 outputted from the auxiliary battery source 127-2.

When the battery supply voltage such as a summation of the main battery voltage 726 and the auxiliary battery voltage 727-1 and auxiliary battery voltage 727-2 falls below the threshold level 745 at time T84 (see FIG. 8 as well), the controller 140 activates switch 125-4 and deactivates switch 125-3. When switch 125-4 is activated (to a shorted state) and the other switches (125-1, 125-2, 125-3, 125-5, etc.) are deactivated (to an open state), the negative terminal of the auxiliary battery source 127-3 (node N74) is connected to the ground reference. In such an instance, the main battery source 126, the auxiliary battery source 127-1, the auxiliary battery source 127-2, and the auxiliary battery source 127-3 are connected in series to the ground reference voltage through switch 125-4 such that the battery supply voltage 129 is equal to the main battery voltage 726 outputted from the main battery source 126 plus the auxiliary battery voltage 727-1 outputted from the auxiliary battery source 127-1 plus the auxiliary battery voltage 727-2 outputted from the auxiliary battery source 127-2, plus the auxiliary battery voltage 727-3 outputted from the auxiliary battery source 127-3.

In this manner, the controller regulates a magnitude of the battery supply voltage 129 to be within a desired voltage range such as between 46 VDC and 50 VDC or other suitable range.

Thus, the main battery source 126 produces a main battery voltage 726. The energy management unit 120 further includes a set of one or more auxiliary battery sources, each of which is operative to produce a respective auxiliary battery voltage. The controller 140 initially sets the battery supply voltage 129 to the main battery voltage 726. The magnitude of the main battery voltage 726 decreases over time. The main battery voltage 726 is supplied to the power converter 150. The controller 140 monitors a magnitude of the battery supply voltage 129 and adjusts a magnitude of the battery supply voltage 129 supplied to the power converter based on a comparison of the magnitude of the main battery voltage 726 with respect to a threshold level 745. The adjustment of the battery supply voltage 129 over time is provided from a serial connection of the main battery source 126 and one or more auxiliary battery sources 127 depending on which of the switches 125 is activated via control signals 107.

In this manner, the controller 140 electrically couples a different node of the energy management unit 120 (a respective auxiliary battery source) to a ground reference voltage to adjust the magnitude of the battery supply voltage, resulting in regulating the magnitude of the battery supply voltage 129.

As previously discussed, the bidirectional power converter 150 can be configured to charge the main battery source 126 and one or more of the auxiliary battery sources 127 depending on a respective state of the switches 125 during a condition in which the voltage source 102 produces the voltage 121 powering the load 118. As shown in FIG. 2, during the charge mode #2, the bidirectional power converter 150 uses the voltage 121 to produce the voltage 191 supplied to the positive terminal of the main battery source 126. The controller 140 selects, via control signals 107, one of the multiple switches 125 to activate to an on state (shorted) to simultaneously charge one or more of the battery supplies.

More specifically, during the charge mode, the controller 140 activates switch 125-1 while all of the switches are set to an off state in order to charge only the main battery supply 126; the controller 140 activates switch 125-2 while all of the switches other than switch 125-2 are set to an off state in order to simultaneously charge the series connection of main battery supply 126 and auxiliary battery source 127-1; the controller 140 activates switch 125-3 while all of the other switches are set to an off state in order to simultaneously charge the series connection of main battery supply 126, auxiliary battery source 127-1, and auxiliary battery source 127-2; and so on. Thus, the controller 140 can be configured to charge different sets of batteries of the energy management unit 120 at different times.

In one implementation, each of the multiple auxiliary battery sources 127 includes multiple batteries connected in parallel. As previously discussed, via connector nodes N71, N72, N73, N74, etc., the multiple auxiliary battery sources 127 are connected in series to produce a series stack of auxiliary battery sources 127 electrically coupled to the main battery source 126. Each of the auxiliary battery sources 127 can be configured to include a different number of batteries in parallel.

Because the auxiliary battery sources nearer the main battery source 126 are used for a longer amount of time during backup and charge depletion, a magnitude of a number of the multiple batteries connected in parallel for a respective auxiliary battery source in the stack varies depending on a location of the respective auxiliary battery source in the serial stack.

More specifically, the auxiliary battery source 127-1 can be configured to include 12 individual batteries in parallel to produce auxiliary battery voltage 727-1; the auxiliary battery source 127-2 can be configured to include 10 individual batteries in parallel to produce auxiliary battery voltage 727-2; the auxiliary battery source 127-2 can be configured to include 8 individual batteries in parallel to produce auxiliary battery voltage 727-2; the auxiliary battery source 127-3 can be configured to include 6 individual batteries in parallel to produce auxiliary battery voltage 727-3; the auxiliary battery source 127-4 can be configured to include 4 individual batteries in parallel to produce auxiliary battery voltage 727-4; and so on.

Thus, in such an instance, the first auxiliary battery source 127-1 in the stack nearer the main battery source 126 is configured to include a greater number of batteries in parallel than a second auxiliary battery source 127-2 in the stack disposed further away from the main battery source 126.

Figure 8:
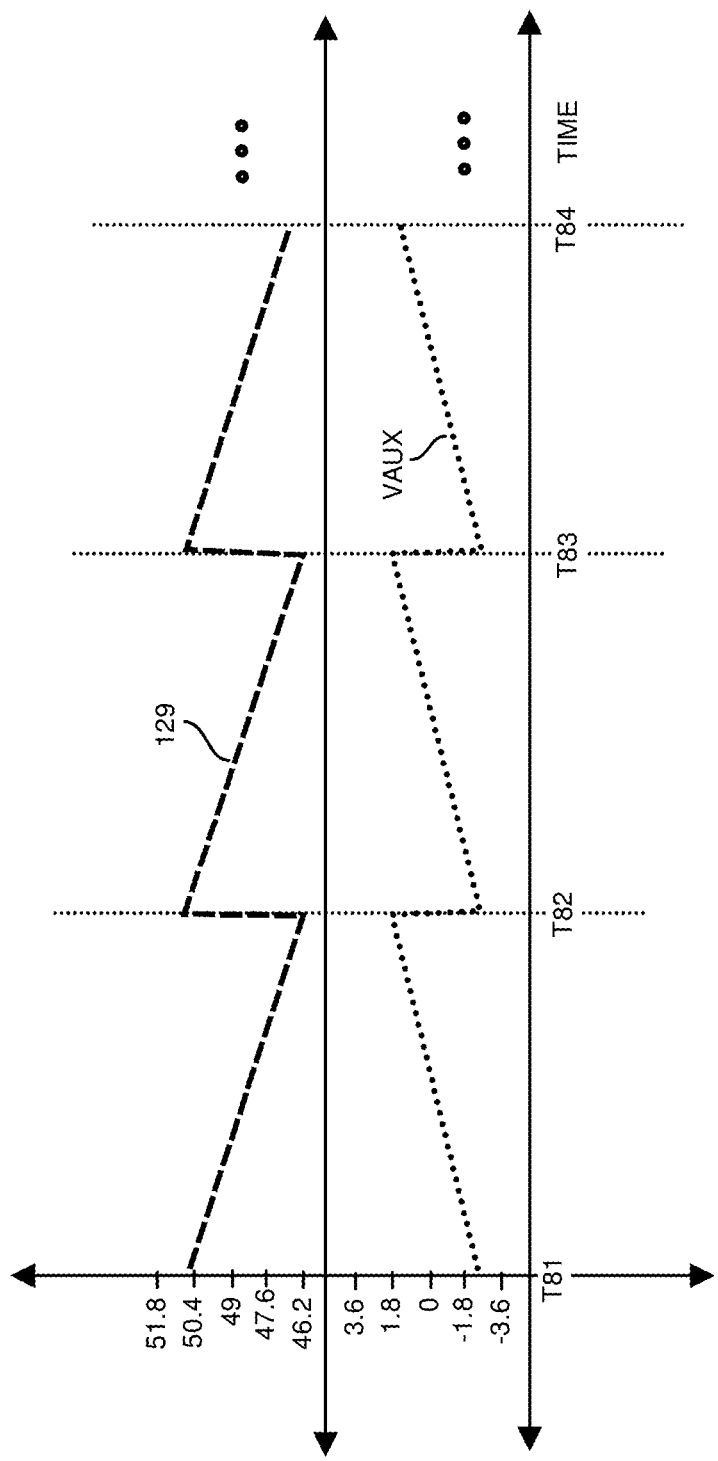
FIG. 8 is an example diagram illustrating control (regulation) of a magnitude of a battery supply voltage as discussed herein.

FIG. 8 is an example diagram illustrating control of a magnitude of a battery supply voltage as discussed herein.

As previously discussed, between time T81 and time T82, the controller activates the switch 125-1. The magnitude of the main battery voltage 726 reduces over time.

In response to detecting that the magnitude of the battery supply voltage 129 falls below a respective threshold level 745 at time T82, the controller 140 activates only switch 125-2 in the stack the control signals 107 to connect the node N72 to the ground reference voltage. This causes the battery supply voltage 129 to be a summation of the main battery voltage 726 and the auxiliary battery voltage 727-1.

In response to detecting that the magnitude of the battery supply voltage 129 falls below a respective threshold level 745 at time T83, the controller 140 activates only switch 125-3 to connect the node N73 to the ground reference voltage. This causes the battery supply voltage 129 to be a summation of the main battery voltage 726, the auxiliary battery voltage 727-1, and the auxiliary battery voltage 727-2.

In this manner, the controller 140 maintains a magnitude of the battery supply voltage 129 between approximately 46 volts DC and 50 volts DC.

It has to be highlighted that by the introduction of the auxiliary switching network it is possible to tailor the battery discharging characteristic and to narrow down the voltage range without reducing the amount of total available energy with respect to a standard 14S5P or 12S6P battery pack and by employing exactly the same elementary cells. Moreover, in case it is necessary to protect the always connected main battery (such as main battery cells) from over-discharging it is possible to deem the battery fully discharged and therefore to start the charging phase simply when these cells are fully discharged regardless of the state of charge of the auxiliary batteries (such as auxiliary battery cells). However when the charging phase has to start, all of the switches 125 are turned off except the last one making all the cells connected and ready to be charged.

Because the battery supply voltage 129 is regulated to a narrow voltage range of 50.4V to 46.2V (or other suitable range), the partial power converter can be rated to supply 150 watts instead of 3 kW required for larger ranges.

Figure 9:
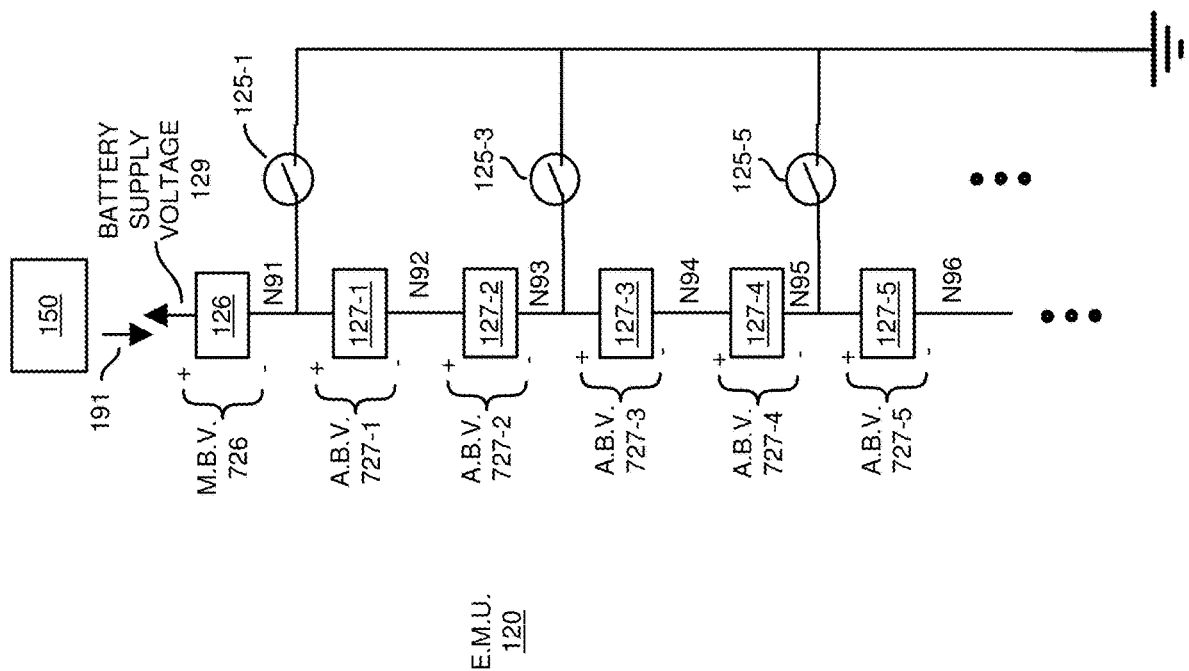
FIG. 9 is an example diagram illustrating generation of a battery supply voltage via a main battery source and one or more auxiliary battery sources.

FIG. 9 is an example diagram illustrating generation of a battery supply voltage via a main battery source and one or more auxiliary battery sources.

The working principle of the power supply implementing the energy management unit 120 in FIG. 9 is the same as previously discussed with respect to FIG. 7. However, the difference in FIG. 9 now lies in the fact that each switches adds two cells (rather than one) at a time when activated, resulting in a reduced number of auxiliary switches, specifically given N_aux auxiliary cells the number of auxiliary switches will be N_aux/2+1.

Of course, the reduced number of switches has a cost such as widening of the battery voltage range (42 VDC to 50 VDC). This is less optimal because it results 375 W of power processing by the power converter 150, instead of 150 watts. However, the footprint of the power supply 100 is smaller because switch 125-2, switch 125-4, etc., is eliminated from the energy management unit 120.

Figure 10:
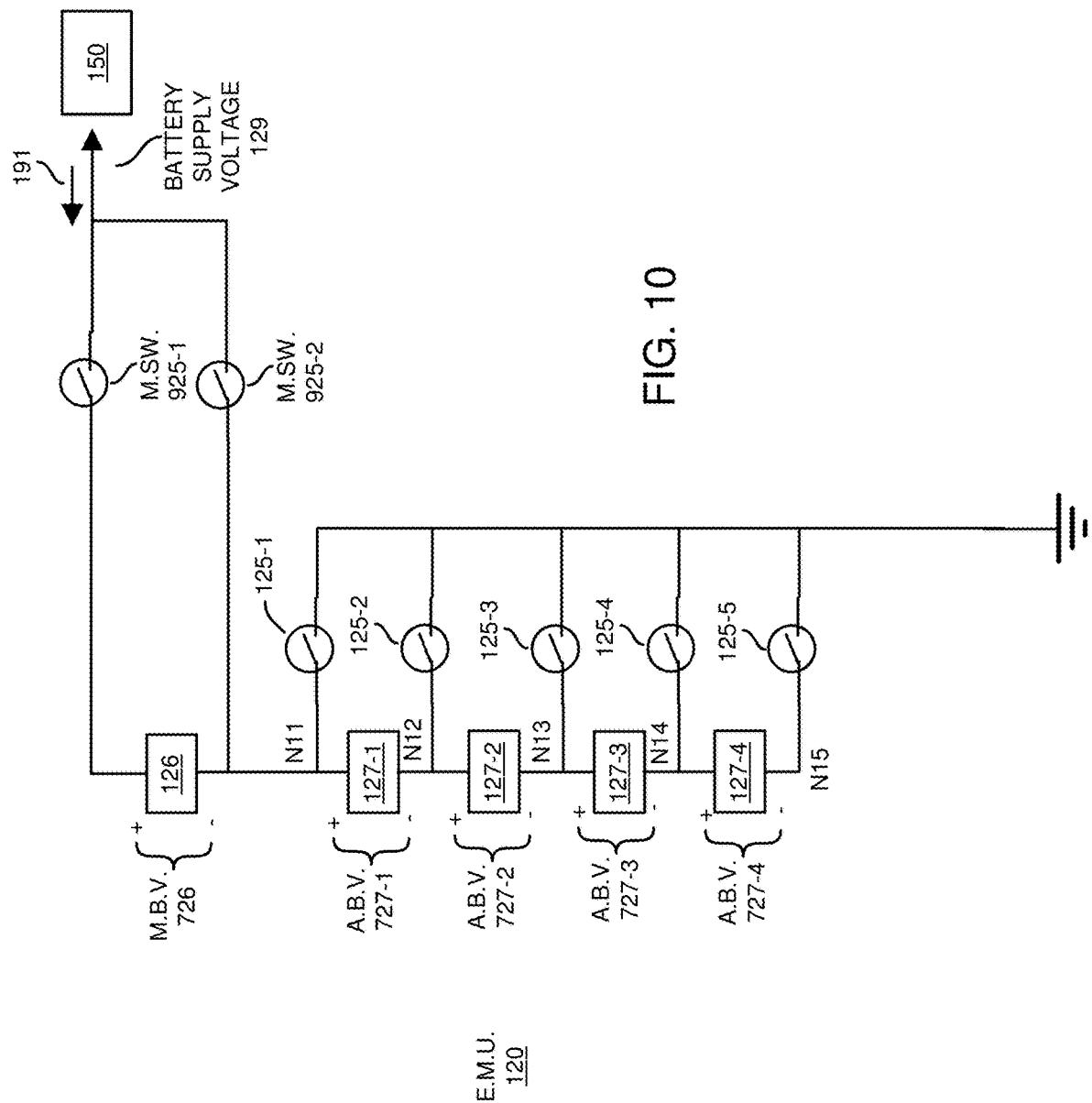
FIG. 10 is an example diagram illustrating generation of a battery supply voltage via a main battery source and one or more auxiliary battery sources based on control of multiple main switches.

FIG. 10 is an example diagram illustrating generation of a battery supply voltage via a main battery source and one or more auxiliary battery sources.

In this example, the main battery source 126 is connected to the power converter 150 via bidirectional switches 925-1, 925-2, 125-1, 125-2, 125-3, 125-4, 125-5, etc., allowing to independently charge/discharge the battery cells with different residual charge if needed. Additionally, note that the set of auxiliary batteries can be charged independently with respect to the one or more main batteries.

Specifically, during a discharge mode #1, the controller 140 controls main switch 925-1 to an ON state and main switch 925-2 to an OFF state. In such an instance, the energy management unit 120 operates in a manner as previously discussed to supply battery supply voltage 129 to the power converter 150. For example, as a magnitude of the battery supply voltage 129 falls below a respective threshold value such as 46 VDC, the controller 140 repeatedly activates one or more switches 125-1, 125-2, 125-3, etc., to maintain a magnitude of the battery supply voltage 129 at a desired magnitude (see FIG. 8 as well).

During a charging phase, when power converter 150 supplies voltage 191 to the energy management unit 120 to charge the main battery source 126, switch 925-1 and switch 125-1 are set ON while all the other switches including switch 925-2 are set OFF. This results in charging of only the main battery source 126.

To charge only the auxiliary battery sources, switch 925-1 and switch 125-1 are turned off while switch 925-2 and one of switches 125-2, 125-3, 125-4, 125-5, etc., is turned on as well.

There are different charging options. For example, it is possible to charge all the auxiliary battery sources 127 at the same time by turning on switch 925-2 and the last switch 125-5 and shutting off switches 125-1, 125-2, 125-3, and 125-4.

After passage of a certain amount of time, switch 125-5 is turned off and switch 125-4 is turned on. This causes the voltage 191 to charge auxiliary battery source 127-1, 127-2, 127-3 while auxiliary battery source 127-4 is not charged.

After passage of a certain amount of time, switch 125-4 is turned off and switch 125-3 is turned on. This causes the voltage 191 to charge auxiliary battery source 127-1 and 127-2 while auxiliary battery sources 127-3 and 127-4 are not charged.

After passage of a certain amount of time, switch 125-3 is turned off and switch 125-2 is turned on. This causes the voltage 191 to charge only auxiliary battery source 127-1.

Activation of the switch 925-1 instead of the switch 925-2 causes the main battery source 126 to be charged as well along with any number of other auxiliary battery sources 127 in the stack.

In a similar manner as previously discussed, during a discharge mode, any combination of one of the switches 925-1 or 925-2 can be activated. Additionally, any one of the auxiliary switches 125-1, 125-2, 125-3, 125-4, and 125-5 can be activated to an on state to charge one or more of the battery sources.

If desired, during a discharge mode of generating the battery supply voltage 129, the one or more of the auxiliary battery sources can be used to generate the battery supply voltage 129. For example, controller 140 opens switch 925-1 and closes switch 925-2. The controller then selects one of switches 125.

Thus, the implementation shown in FIG. 10 enables the possibility to use, during the battery discharging phase, only the auxiliary cells as power source. In this case, switch 925-1 is set to an OFF state while 925-2 is set to an ON state. In a manner as previously discussed, the switches 125-1, 125-2, 125-3, etc., may be turned ON/OFF according to the needed amount of series connected cells. This configuration confers great flexibility to the user as it possible to have a voltage source which is tunable according to needs, (for example a different input voltage may be needed when the converter has to regulate the output voltage to a second value different from the first one).

FIGS. 11A, 11B, 11C, and 11D are example diagrams illustrating generation of a battery supply voltage and states of controlling switches over time.

As previously discussed, the controller 140 can be configured to produce the battery supply voltage 129 from a voltage of one of the connection nodes (N21, N22, N23, etc.) to maintain the magnitude of the battery supply voltage 129 supplied to the power converter 150 within a desired voltage range.

In this example, the negative terminal of the main battery source 126 is connected to a ground reference voltage. The positive terminal of the main battery source 126 is connected to the node N21. Thus, in this example, the main battery source 126 is disposed at the bottom of the stack in the energy management unit 120.

The main battery source 126 is hard-wired coupled in series with the first auxiliary battery source 127-1 in the set (stack) via a first connection node N21; the first auxiliary battery source 127-1 is hard-wired coupled in series with a second auxiliary battery source 127-2 in the set via a second connection node N22; the second auxiliary battery source 127-2 is hard-wired coupled in series with a third auxiliary battery source 127-3 in the set via a third connection node N23; and so on.

The energy management unit 120 in this example further includes multiple switch pairs (ladder of switches at different levels) to provide connectivity of a respective node in the serial stack to the output path (node N31) coupled to the power converter 150.

For example, the switch pair Q21 and Q22 are connected in series between the node N21 and node N31. The controller 140 produces the signal S21 to drive the gate of switch Q21; the controller 140 produces the control signal S22 to drive the gate of switch Q22. The drain node of switch Q21 is electrically coupled to the node N21; the source node of the switch Q21 is connected to the source node of switch Q22; the drain node of switch Q22 is connected to the node N31. Thus, switch Q21 and switch Q22 are disposed back-to-back, source node to source node.

Each of the switch pairs in the energy management unit 120 is configured in a similar manner. For example, the switch pair Q23 and Q24 are connected in series between the node N22 and node N31. The controller 140 produces the signal S23 to drive the gate of switch Q23; the controller 140 produces the control signal S24 to drive the gate of switch Q24. The drain node of switch Q23 is electrically coupled to the node N22; the source node of the switch Q23 is connected to the source node of switch Q24; the drain node of switch Q24 is connected to the node N31. Thus, switch Q23 and switch Q24 are disposed back-to-back, source node to source node.

The switch pair Q25 and Q26 are connected in series between the node N23 and node N31. The controller 140 produces the signal S25 to drive the gate of switch Q25; the controller 140 produces the control signal S26 to drive the gate of switch Q26. The drain node of switch Q25 is electrically coupled to the node N23; the source node of the switch Q25 is connected to the source node of switch Q26;

the drain node of switch Q26 is connected to the node N31. Thus, switch Q25 and switch Q26 are disposed back-to-back, source node to source node.

The switch pair Q27 and Q28 are connected in series between the node N24 and node N31. The controller 140 produces the signal S27 to drive the gate of switch Q27; the controller 140 produces the control signal S28 to drive the gate of switch Q28. The drain node of switch Q27 is electrically coupled to the node N24; the source node of the switch Q27 is connected to the source node of switch Q28; the drain node of switch Q28 is connected to the node N31. Thus, switch Q27 and switch Q28 are disposed back-to-back, source node to source node.

In a similar manner as previously discussed, the controller 140 controls how many of the battery sources are disposed in series based on a magnitude of the battery supply voltage 129. In this example implementation, the auxiliary cells (auxiliary battery sources 127) are connected on top of the main cells (main battery source 126). The switches are realized with Mosfets or other suitable transistor types in back-to-back configuration for bidirectional blocking capability.

Figure 11:
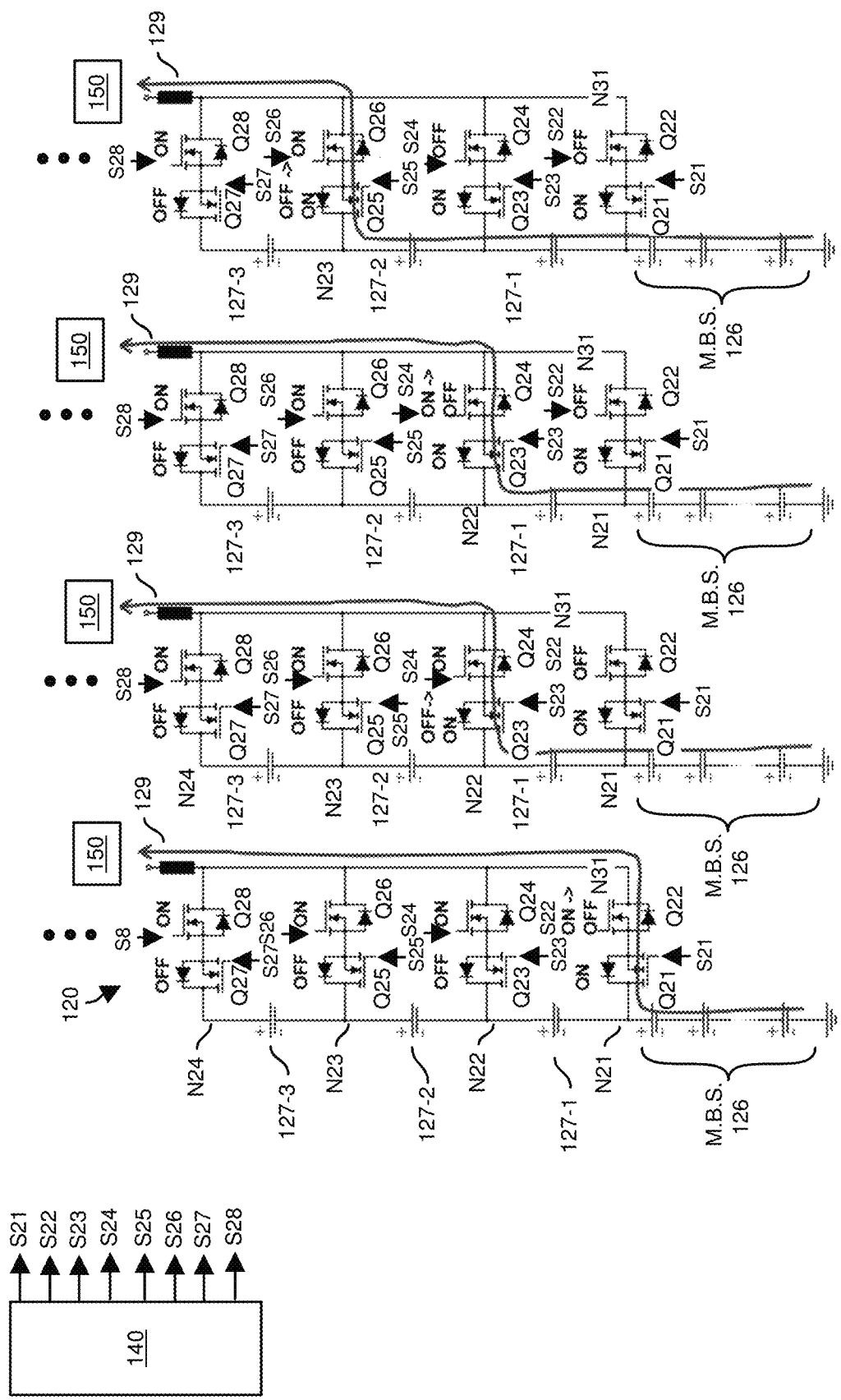
FIGS. 11A, 11B, 11C, and 11D are example diagrams illustrating generation of a battery supply voltage via control of switch pairs.

The commutation sequence for the discharging a phase is also shown in FIG. 11. In the conducting auxiliary leg of FIG. 11A, both switches Q21 & Q22 are conducting (in an ON state). This connects node N31 to the node N21 via a low impedance path through the switch Q21 and Q22. In order to add an auxiliary battery source 127-1 in series with the main battery source 126, the controller 140 shuts OFF switch Q22 and its body diode goes into conduction. Switch Q24 in FIG. 11A is already ON.

The actual transition of connecting node N31 to the node N22 (instead of node 21) occurs when switch Q23 is turned ON in FIG. 11B. This is a hard commutation from body diode of switch Q22 to switch Q23.

The similar sequence of control as shown in FIGS. 11A, 11B, and 11C is repeated for a next auxiliary battery source in the stack when adding another auxiliary battery source in series as additional serially connected auxiliary battery sources are needed to increase a magnitude of the battery supply voltage 129.

Thus, the controller 140, in FIG. 11A, initially controls the first switch circuitry pair (combination of switch Q21 and Q22) to an ON state and the second switch circuitry pair (combination of switch circuitry Q23 and Q24) to an OFF state to produce the supply voltage 129 from a voltage at the first connection node N21 during a first condition in which a magnitude of the main battery voltage associated with main battery source 126 is above a threshold level.

As previously discussed, the controller 140 connects an auxiliary battery source in series with the main battery source 126 to increase its voltage when a magnitude of the main battery source 126 falls below a threshold value. Assume that the controller 140 detects that the magnitude of the battery supply voltage 129 falls below a threshold value. In such an instance, the controller 140, in FIG. 11B, controls the second switch circuitry (combination of switch Q23 and Q24) to an ON state and the first switch circuitry (combination of switch Q21 and Q22) to an OFF state to produce the supply voltage 129 from the second connection node N22 during a second condition in which the magnitude of the main battery voltage such as the main battery source 126 is below the threshold level.

In this manner, via control of switch pairs, the control 140 electrically connects different node N21, N22, N23, etc., to the node N31 via different switch pairs to regulate a magnitude of the battery supply voltage 129.

In a similar manner as previously discussed, the switch pairs in the energy management unit 120 can be configured to convey respective voltage 191 produced by the power converter 150 to any desired sequence of one or more battery sources.

Figure 12:
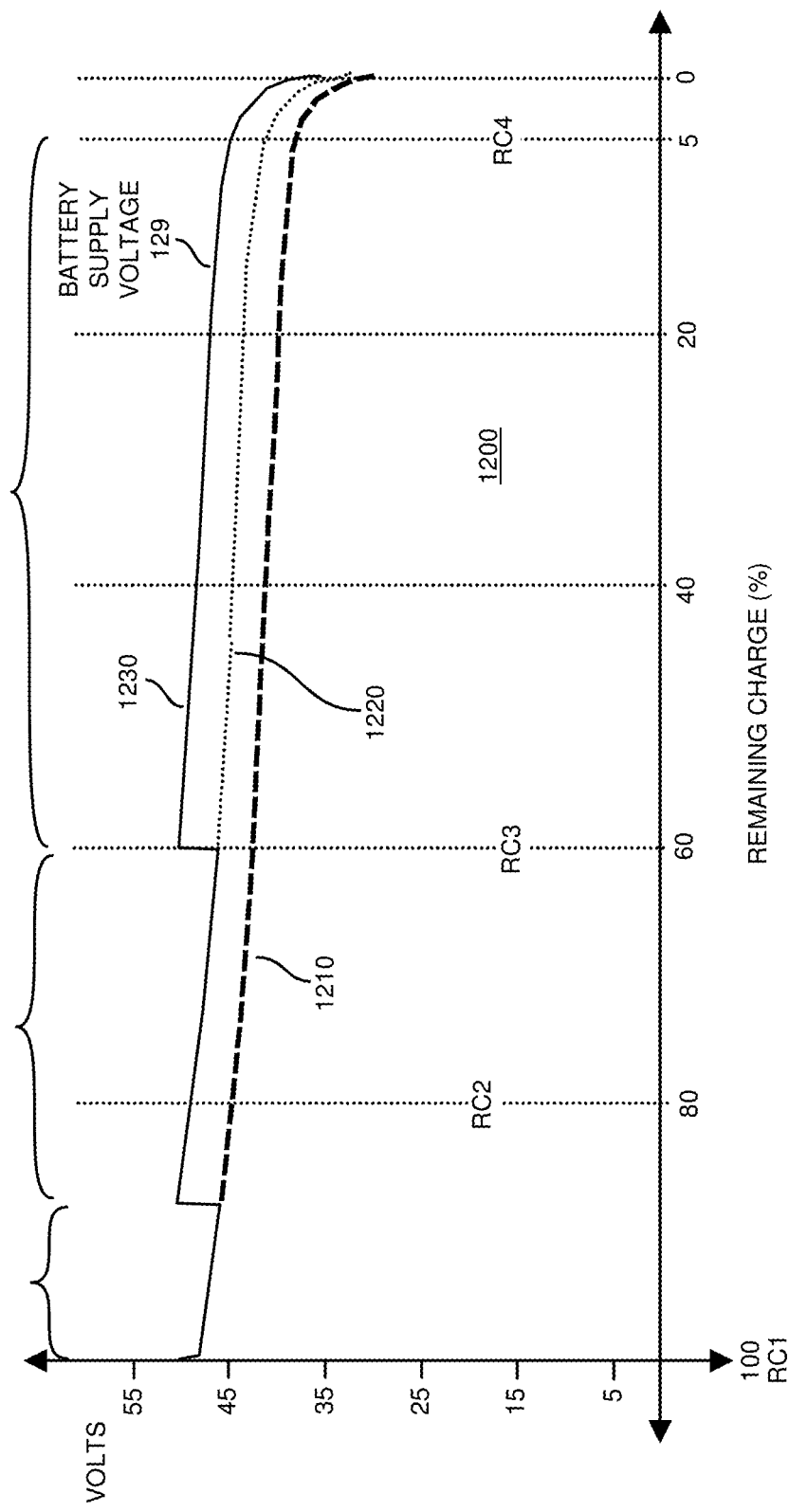
FIG. 12 is an example diagram illustrating a graph of battery supply voltage versus remaining charge.

FIG. 12 is an example diagram illustrating a graph illustrating a battery supply voltage versus remaining charge.

In order to keep the number of cells reasonable and cost attractive from the customer perspective, one solution is to have only two sets of series connected auxiliary cells (and therefore also only 3 auxiliary switches).

The graph 1200 illustrates a function of the battery supply voltage 129 depending on a magnitude of voltage a battery source.

Initially, the main battery source provides the battery supply voltage 129 when its charge is around 50 VDC. In a manner as previously discussed, the magnitude of the of battery supply voltage 129 decreases.

When the remaining charge in the main battery source is around 86% (RC2), the controller 140 adds a first auxiliary battery source 127-1 in series with the main battery source to increase the voltage again to around 50 VDC. The magnitude of the of battery supply voltage 129 decreases.

When the remaining charge in the main battery source is around 60% (RC3), the controller 140 adds a second auxiliary battery source 127-2 in series with the main battery source and first auxiliary battery source 127-1 to increase the voltage again to around 50 VDC.

When the remaining charge in the main battery source is around 5% (RC4), such as estimated or based on feedback from the corresponding battery sources themselves, the controller 140 discontinues generating the battery supply voltage 129 because the battery sources are depleted in the battery supply voltage is low.

The controller 140 may monitor a magnitude of the battery supply voltage to determine the charge levels associated with a combination of the main battery sources and the auxiliary battery sources and discontinue producing the battery supply voltage from the main battery source and the set of at least one auxiliary battery sources in response to detecting that the monitored battery supply voltage 129 falls below a threshold level indicating that around 5% of overall charge is remaining.

Alternatively, the controller 140 may monitor charge levels of each of the main battery sources and the auxiliary battery sources in the set and discontinue producing the battery supply voltage from the main battery source and the set of at least one auxiliary battery sources in response to detecting that the monitored charge levels fall below a threshold value.

Thus, in this example, the curve 1210 is the battery supply voltage 129 if only the main battery source is implemented to produce the battery supply voltage 129, the curve 1220 is the battery supply voltage 129 with only one set of auxiliary cells (such as auxiliary battery source 127-1 plus the main battery source 126), the curve 1230 is the battery supply voltage 129 with two set of series connected auxiliary cells (such as auxiliary battery source 127-1 plus the auxiliary battery source 127-2 plus the main battery source 126).

Referring to the curve 1230 in FIG. 12, the battery discharging phase starts with only the main cells conducting. Once the battery voltage reaches around 46.2 VDC at RC2, the first set of auxiliary cell is added to the stack boosting the battery supply voltage 129 to around 50.4 VDC. Again, as soon as the total stack voltage decreases to 46.2 VDc, the second set of auxiliary cells are added to the stack bringing the total voltage to 50.4 VDC.

However in this case, where only two sets of auxiliary cells, ending the discharging phase when the state of charge of the main cells is less than 5% is not beneficial since at such discharge level, as shown in FIG. 12, the total stack voltage will be around 36.4 VDC, which is too far from the 48V output voltage. A very convenient solution would be to deem the one or more battery sources fully discharged when the main cells state (main battery source 126) of charge is around 5% (RC4). In such an instance, the lowest battery supply voltage 129 reached by the battery is 45 VDC, leading to a maximum processed power (at which the converter must be rated) of only 188 W to supply a 3 kW load. However, as the auxiliary cells start discharging only after a certain amount of time with respect to the main cells (such as main battery source), their capacity will not be fully utilized.

Finally, a commercially very attractive solution would be to build a battery pack where the main battery source includes a 12S5P battery pack, while each of the first and second set of auxiliary battery sources are respectively a 1S4P battery pack and 1S3P battery pack. This way, the total number of cells (12×5+1×4+1×3=67) is even below the standard 14S5P (or 12S6P) battery, therefore reducing total battery cost. In addition, as a lower number of parallel cells is used for the successive auxiliary battery sources in the stack, the discharge current of such cells will be higher than the one of the main cells leading to a faster discharge and therefore to a higher capacity utilization.

Figure 13:
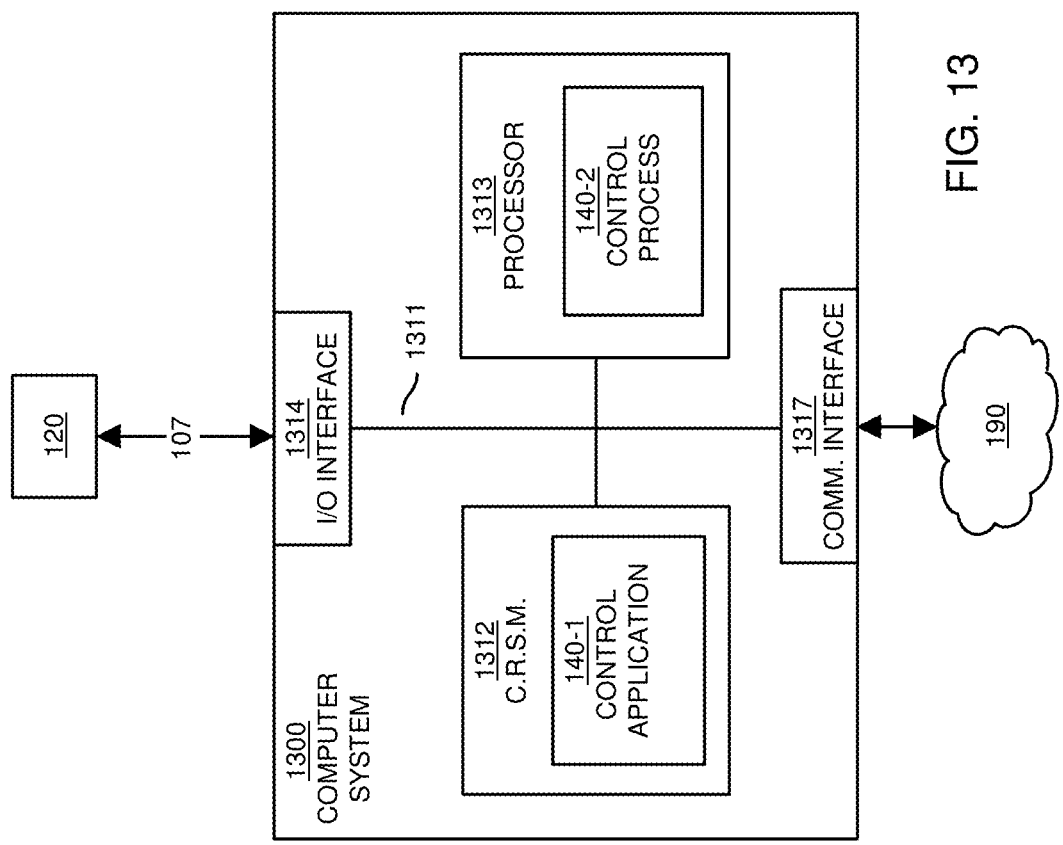
FIG. 13 is an example diagram illustrating computer processor hardware and related software instructions that execute methods as discussed herein.

FIG. 13 is an example block diagram of a computer device for implementing any of the operations as discussed herein.

As shown, computer system 1300 (such as implemented by any of one or more resources such as controller 140, energy management unit 120, bidirectional power converter 150, etc.) of the present example includes an interconnect 1311 that couples computer readable storage media 1312 such as a non-transitory type of media (or hardware storage media) in which digital information can be stored and retrieved, a processor 1313 (e.g., computer processor hardware such as one or more processor devices), I/O interface 1314 (e.g., to output control signals to the power converter phases, monitor current, etc.), and a communications interface 1317.

I/O interface 1314 provides connectivity to any suitable circuitry such as power supply 100 and corresponding power converter phases 111, 112, etc.

Computer readable storage medium 1312 can be any hardware storage resource or device such as memory, optical storage, hard drive, floppy disk, etc. The computer readable storage medium 1312 stores instructions and/or data used by the controller application 140-1 to perform any of the operations as described herein.

Communications interface 1317 enables the computer system 1300 and processor 1313 to communicate over a resource such as network 190 to retrieve information from remote sources and communicate with other computers.

As shown, computer readable storage media 1312 (such as computer-readable storage hardware) is encoded with controller application 140-1 (e.g., software, firmware, etc.) executed by processor 1313. Controller application 140-1 can be configured to include instructions to implement any of the operations as discussed herein.

During operation, processor 1313 accesses computer readable storage media 1312 via the use of interconnect 1311 in order to launch, run, execute, interpret or otherwise perform the instructions in controller application 140-1 stored on computer readable storage medium 1312.

Execution of the controller application 140-1 produces processing functionality such as controller process 140-2 in processor 1313. In other words, the controller process 140-2 associated with processor 1313 represents one or more aspects of executing controller application 140-1 within or upon the processor 1313 in the computer system 1300.

In accordance with different implementations, note that computer system 1300 can be a micro-controller device, logic, hardware processor, hybrid analog/digital circuitry, etc., configured to control a power supply and perform any of the operations as described herein.

Functionality supported by the different resources will now be discussed via flowchart in FIG. 13. Note that the steps in the flowcharts below can be executed in any suitable order.

Figure 14:
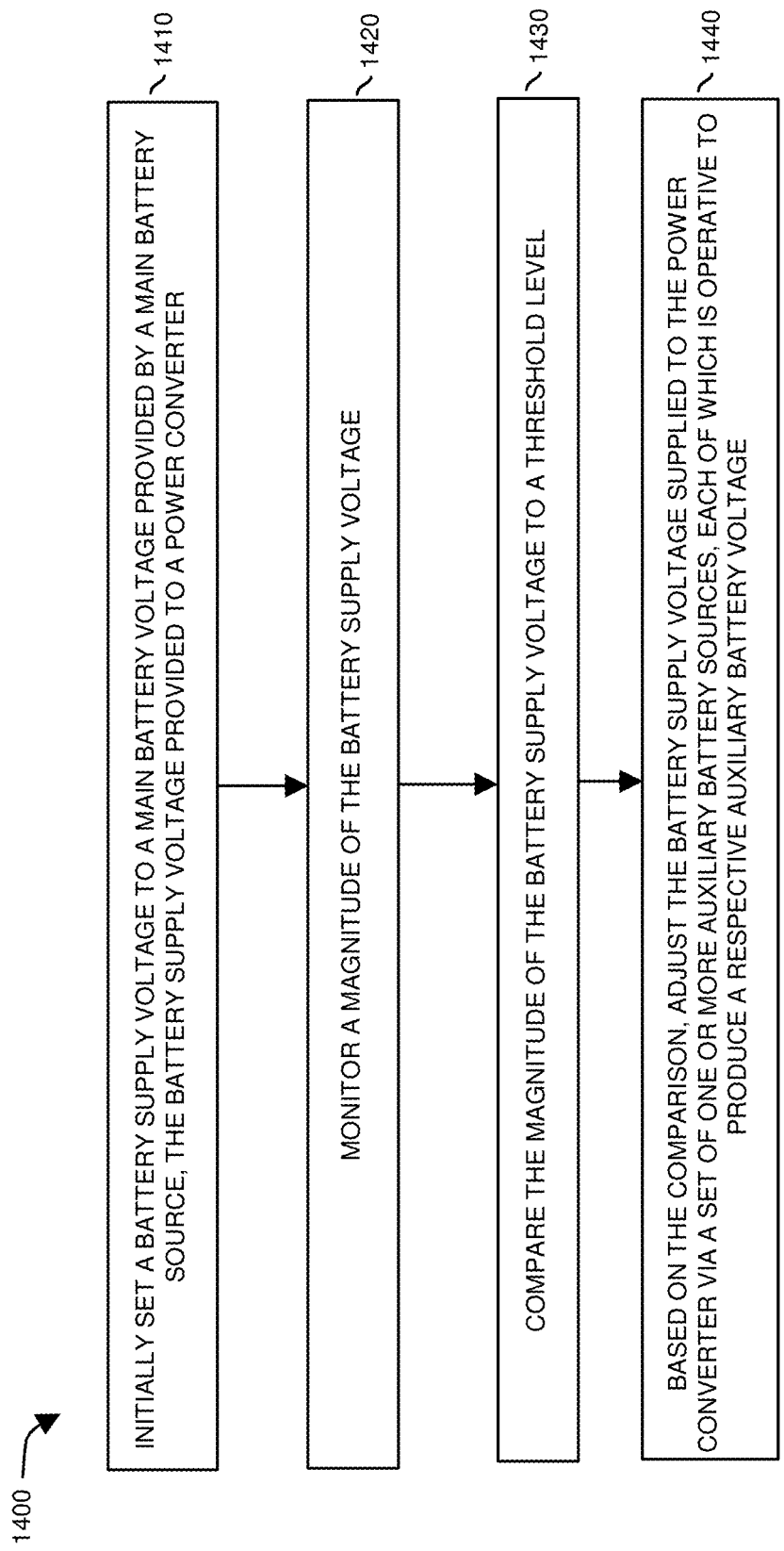
FIG. 14 is an example diagram illustrating a method as discussed herein.

FIG. 14 is an example diagram illustrating a method of controlling a power converter.

In processing operation 1410, the controller 140 produces a battery supply voltage 129 supplied to a power converter 150 based on a main battery voltage produced by a main battery source 126.

In processing operation 1420, the controller 140 monitors a magnitude of the battery supply voltage 129.

In processing operation 1430, the controller 140 compares the magnitude of the main battery voltage to a threshold level 745.

In processing operation 1440, based on the comparison (output 760), the controller 140 adjusts the battery supply voltage 129 supplied to the power converter. The adjusted battery supply voltage 129 is provided from a serial connection of the main battery source 126 and a first auxiliary battery source 127-1 in the set.

Figure 15:
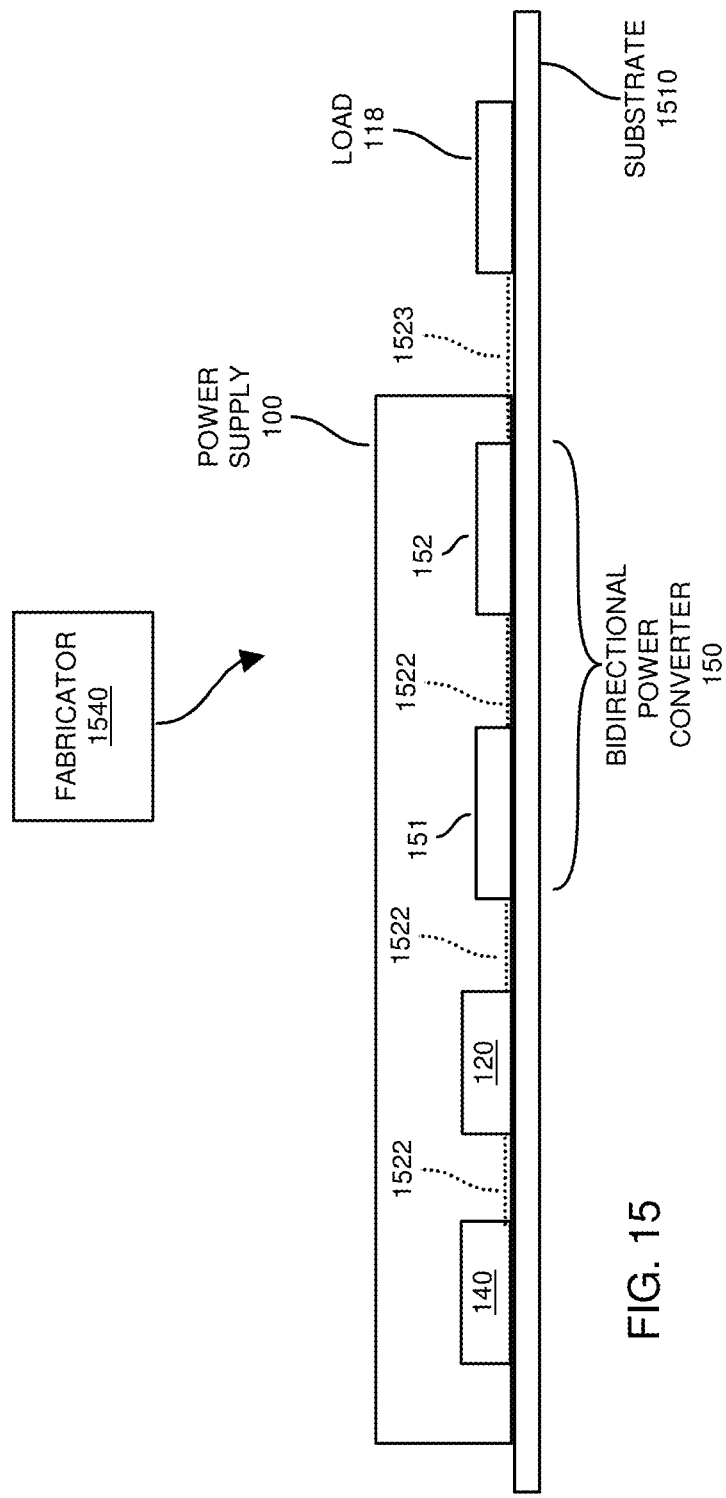
FIG. 15 is an example diagram illustrating assembly of a circuit.

FIG. 15 is an example diagram illustrating assembly of a power supply and multiple interconnected power converter phases on a circuit board.

Assembler 1540 receives a substrate 1510 and corresponding components of power supply 100 to fabricate controller 140, energy management unit 120, power bidirectional power converter 150 including the power converter stage 151 and power converter stage 152, etc. The assembler 1540 affixes (couples) the controller 140 and other components such as associated with the power supply 100 to the substrate 1510.

Via respective circuit paths 1522 as described herein, the assembler 1540 provides connectivity between the controller 140, energy management unit 120, power converter stage 151, power converter stage 152, etc.

Note that components such as the controller 140, bidirectional power converter 150, energy management unit 120, and corresponding components can be affixed or coupled to the substrate 1510 in any suitable manner. For example, each of the one or more of the components in power supply 100 can be soldered to the substrate 1510, inserted into respective sockets disposed on the substrate 1510, etc.

Note further that the substrate 1510 is optional. Any of one or more circuit paths or connectivity as shown in the drawings and as described herein can be disposed in cables or other suitable medium.

The load 118 is disposed on its own substrate independent of substrate 1510; the substrate of the load 118 (such as substrate 1510 or other substrate) is directly or indirectly connected to the substrate 1510 via connectivity 1523 such as one or more of wires, cables, links, etc. The controller 140 or any portion of the power supply 100 and corresponding power converter stages 151 and 152 can be disposed on a standalone smaller board plugged into a socket of the substrate 1510 as well.

Via one or more circuit paths 1523 (such as one or more traces, cables, connectors, wires, conductors, electrically conductive paths, etc.), the assembler 1540 couples the power supply 100 and corresponding components to the load 118. The circuit path 1523 conveys the backup voltage 221 and corresponding current to the load 118.

Accordingly, this disclosure includes a system comprising: a substrate 1510 (such as a circuit board, standalone board, mother board, standalone board destined to be coupled to a mother board, host, etc.); a power supply system 100 including corresponding components as described herein; and a load 118 (such as a motor, winding, etc.).

Note that the load 118 can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 1110 or disposed at a remote location.

Note again that techniques herein are well suited for use in circuit applications such as those that that generate an output voltage to power a load. However, it should be noted that implementations herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred implementations thereof, it will be understood by those skilled in the art that various changes in form and details may be made therein without departing from the spirit and scope of the present application as defined by the appended claims. Such variations are intended to be covered by the scope of this present application. As such, the foregoing description of implementations of the present application is not intended to be limiting. Rather, any limitations to the invention are presented in the following claims.

The invention claimed is:

1. An apparatus comprising:
   a main battery source operative to produce a main battery voltage;
   a set of one or more auxiliary battery sources, each of which is operative to produce a respective auxiliary battery voltage; and
   a controller operative to:
   i) initially set a battery supply voltage to the main battery voltage, the battery supply voltage supplied to a power converter;
   ii) monitor a magnitude of the battery supply voltage; and
   iii) via at least one of the auxiliary battery sources in the set, adjust the battery supply voltage supplied to the power converter based on a comparison of the magnitude of the battery supply voltage with respect to a threshold level;
   wherein the power converter is operative to convert the battery supply voltage into a supplemental voltage in which a summation of the supplemental voltage and the battery supply voltage produces an output voltage to power a load;
   the apparatus further comprising: an energy storage resource disposed in series with the main battery source, the energy storage resource operative to store the supplemental voltage; and
   wherein the controller is operative to generate the output voltage in response to detecting that an input voltage source discontinues powering the load.

2. The apparatus as in claim 1, wherein the adjusted battery supply voltage is provided from a serial connection of the main battery source and a first auxiliary battery source in the set, the first auxiliary battery source operative to produce a first auxiliary battery voltage, the adjusted battery supply voltage being a first summation of the main battery voltage and the first auxiliary battery voltage.

3. The apparatus as in claim 2, wherein the controller is further operative to produce the adjusted battery supply voltage to be the first summation of the main battery voltage and the first auxiliary battery voltage in response to detecting that the magnitude of the battery supply voltage falls below the threshold level.

4. An apparatus comprising:
   a main battery source operative to produce a main battery voltage;
   a set of one or more auxiliary battery sources, each of which is operative to produce a respective auxiliary battery voltage; and
   a controller operative to:
   i) initially set a battery supply voltage to the main battery voltage, the battery supply voltage supplied to a power converter;
   ii) monitor a magnitude of the battery supply voltage; and
   iii) via at least one of the auxiliary battery sources in the set, adjust the battery supply voltage supplied to the power converter based on a comparison of the magnitude of the battery supply voltage with respect to a threshold level;

wherein the adjusted battery supply voltage is provided from a serial connection of the main battery source and a first auxiliary battery source in the set, the first auxiliary battery source operative to produce a first auxiliary battery voltage, the adjusted battery supply voltage being a first summation of the main battery voltage and the first auxiliary battery voltage;

wherein the controller is further operative to produce the adjusted battery supply voltage to be the first summation of the main battery voltage and the first auxiliary battery voltage in response to detecting that the magnitude of the battery supply voltage falls below the threshold level; and wherein the controller is further operative to: i) monitor the battery supply voltage equal to the first summation, and ii) in response to detecting that the battery supply voltage equal to the first summation falls below the threshold level, produce the adjusted battery supply voltage to be a second summation, the second summation being a sum of: i) the main battery voltage, ii) the first auxiliary battery voltage, and iii) a second auxiliary battery voltage provided by a second auxiliary battery source in the set.

5. An apparatus comprising:
a main battery source operative to produce a main battery voltage;
a set of one or more auxiliary battery sources, each of which is operative to produce a respective auxiliary battery voltage; and
a controller operative to:
  i) initially set a battery supply voltage to the main battery voltage, the battery supply voltage supplied to a power converter;
  ii) monitor a magnitude of the battery supply voltage; and
  iii) via at least one of the auxiliary battery sources in the set, adjust the battery supply voltage supplied to the power converter based on a comparison of the magnitude of the battery supply voltage with respect to a threshold level;
wherein the adjusted battery supply voltage is provided from a serial connection of the main battery source and a first auxiliary battery source in the set, the first auxiliary battery source operative to produce a first auxiliary battery voltage, the adjusted battery supply voltage being a first summation of the main battery voltage and the first auxiliary battery voltage;
wherein the controller is further operative to produce the adjusted battery supply voltage to be the first summation of the main battery voltage and the first auxiliary battery voltage in response to detecting that the magnitude of the battery supply voltage falls below the threshold level; and
wherein discharge of energy stored in the main battery source causes the magnitude of the battery supply voltage to fall below the threshold level.

6. The apparatus as in claim 1, wherein the main battery source and each of the auxiliary battery sources in the set are connected in series with each other via connection nodes.

7. The apparatus as in claim 6, wherein the controller is operative to produce the battery supply voltage from a voltage outputted from one of the connection nodes to maintain the magnitude of the battery supply voltage within a desired voltage range.

8. The apparatus as in claim 1, wherein the controller is further operative to:
discontinue producing the battery supply voltage from the main battery source and the set of at one or more auxiliary battery sources during a condition in which charge levels of the main battery source and the set of one or more auxiliary battery sources fall below a threshold value.

9. The apparatus as in claim 1, wherein the main battery source is hard-wired coupled in series with a first auxiliary battery source in the set via a first connection node;
wherein the first auxiliary battery source is hard-wired coupled in series with a second auxiliary battery source in the set via a second connection node;
the apparatus further comprising:
  first switch circuitry controlled by the controller;
  second switch circuitry controlled by the controller; and
  wherein the controller is operative to: i) control the first switch circuitry to an ON state and the second switch circuitry to an OFF state to produce the battery supply voltage from a voltage at the first connection node during a first condition in which a magnitude of the main battery voltage is above the threshold level, and ii) control the second switch circuitry to an ON state and the first switch circuitry to an OFF state to produce the battery supply voltage from the second connection node in response to detecting a second condition in which the magnitude of the main battery voltage falls below the threshold level.

10. The apparatus as in claim 1, wherein the power converter is a bi-directional power converter operative to charge the main battery source and the set of one or more auxiliary battery sources;
wherein each of the auxiliary battery sources in the set are connected in series with each other; and
wherein the main battery source is connected in series with the series connection of the auxiliary battery sources.

11. The apparatus as in claim 10 further comprising:
a first main switch coupled to a first node of the main battery source;
a second main switch coupled to a second node of the main battery source, the main battery voltage representing a voltage across the first node and the second node;
auxiliary switches, each of which is coupled to a respective node connecting a corresponding pair of serially connected auxiliary battery sources in the set; and
wherein the controller is further operative to control states of the first main switch, the second main switch, and the auxiliary switches to selectively control charging of the main battery source and the one or more auxiliary battery sources at different times.

12. The apparatus as in claim 1, wherein each of the one or more auxiliary battery sources in the set includes multiple batteries connected in parallel, the one or more auxiliary battery sources connected in series to produce a series stack of auxiliary battery sources electrically coupled to the main battery source, a magnitude of a number of the one or more batteries connected in parallel for a respective auxiliary battery source in the series stack varying depending on a location of the respective auxiliary battery source in the series stack.

13. The apparatus as in claim 12, wherein a first auxiliary battery source in the series stack nearer the main battery source is configured to include a greater number of batteries in parallel than a second auxiliary battery source in the series stack disposed further away from the main battery source.

14. The apparatus as in claim 1, wherein the controller is further operative to electrically couple a node of a respective auxiliary battery source in the set to a reference voltage to adjust the magnitude of the battery supply voltage.

15. A system comprising:
the apparatus and the power converter as in claim 1; and
wherein the power converter is a partial power converter operative to convert the battery supply voltage into the output voltage to power the load, the partial power converter further operative to generate the output voltage based on a summation of the battery supply voltage and the supplemental voltage outputted from the partial power converter, the supplemental voltage derived by the partial power converter from the battery supply voltage.

16. The system as in claim 15, wherein the partial power converter is operative to regulate a magnitude of the output voltage with respect to a setpoint reference voltage.

17. The system as in claim 15, wherein the supplemental voltage is a differential voltage produced by the partial power converter, the differential voltage referenced with respect to the battery supply voltage to produce the output voltage.

18. The apparatus as in claim 1, wherein the energy storage resource is a capacitor, the apparatus further comprising:
a first circuit path connecting the capacitor, the main battery source, and one or more of the auxiliary battery sources in the set in series with each other via connection nodes, the power converter producing the supplemental voltage from the battery supply voltage and storing the supplemental voltage in the capacitor; and
wherein the load powered by the battery supply voltage is disposed in parallel with the first circuit path.

19. The apparatus as in claim 1, wherein the power converter is a bidirectional power converter operative to: i) discharge the main battery source and the set of one or more auxiliary battery sources in a first mode of the bidirectional power converter powering the load; and ii) charge the main battery source and the set of one or more auxiliary battery sources in a second mode of the bidirectional power converter receiving an input voltage applied by an input voltage source to power the load.

20. The apparatus as in claim 19, wherein the first mode is a failure mode in which the input voltage source fails to power the load; and
wherein the second mode is a non-failure mode in which the input voltage source powers the load via the input voltage.

21. An apparatus comprising:
a main battery source operative to produce a main battery voltage;
a set of one or more auxiliary battery sources, each of which is operative to produce a respective auxiliary battery voltage; and
a controller operative to:
i) initially set a battery supply voltage to the main battery voltage, the battery supply voltage supplied to a power converter;
ii) monitor a magnitude of the battery supply voltage; and
iii) via at least one of the auxiliary battery sources in the set, adjust the battery supply voltage supplied to the power converter based on a comparison of the magnitude of the battery supply voltage with respect to a threshold level;
the system further comprising an energy storage resource disposed in series between the main battery source and a load;
wherein the power converter is operative to convert the battery supply voltage into a supplemental voltage stored in the energy storage resource;
wherein a first node coupling the main battery source and the energy storage resource supplies the battery supply voltage to the power converter; and
wherein the controller is operative to adjust a magnitude of the supplemental voltage to maintain a magnitude of a backup voltage generated by the power converter to a second node of the energy storage resource, the backup voltage powering the load.

22. The system as in claim 21, wherein the backup voltage powering the load is a summation of the battery supply voltage and the supplemental voltage.

* * * * *